US012574716B2

(12) United States Patent
Lee et al.

(10) Patent No.: US 12,574,716 B2
(45) Date of Patent: Mar. 10, 2026

(54) METHOD AND DEVICE FOR DEVICE DISCOVERY USING UWB

(71) Applicant: Samsung Electronics Co., Ltd., Gyeonggi-do (KR)

(72) Inventors: Jihye Lee, Gyeonggi-do (KR); Kangjin Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 17/560,944

(22) Filed: Dec. 23, 2021

(65) Prior Publication Data

US 2022/0210631 A1     Jun. 30, 2022

(30) Foreign Application Priority Data

Dec. 24, 2020     (KR) ......................... 10-2020-0183390

(51) Int. Cl.
*H04W 8/00*          (2009.01)
*H04B 1/69*          (2011.01)

(52) U.S. Cl.
CPC .............. *H04W 8/005* (2013.01); *H04B 1/69* (2013.01)

(58) Field of Classification Search
CPC ..... H04W 8/005; H04W 72/23; H04W 74/08; H04W 92/18; H04B 1/69; H04B 1/713; H04B 1/7163; H04B 2201/71346
See application file for complete search history.

(56) References Cited

U.S. PATENT DOCUMENTS

| | | | |
|---|---|---|---|
| 2007/0242729 A1 | 10/2007 | Quinn et al. | |
| 2009/0116425 A1* | 5/2009 | Lim ...................... | H04L 1/1664 |
| | | | 370/328 |
| 2012/0163218 A1* | 6/2012 | Kim ..................... | H04W 74/08 |
| | | | 370/252 |
| 2014/0302787 A1* | 10/2014 | Rantala ................. | H04W 8/005 |
| | | | 455/41.2 |

(Continued)

FOREIGN PATENT DOCUMENTS

EP          3 503 044          6/2019

OTHER PUBLICATIONS

"IEEE Standard for Low-Rate Wireless Networks Amendment: Enhanced High Rate Pulse (HRP) and Low Rate Pulse (LRP) Ultra Wide-Band (UWB) Physical Layers (PHYs) and Associated Ranging Techniques," in IEEE P802.15.4z/D03, Oct. 2019, vol. No. pp. 1-180, Oct. 14, 2019, (Year: 2019).*

(Continued)

*Primary Examiner* — Sam K Ahn
*Assistant Examiner* — Amneet Singh
(74) *Attorney, Agent, or Firm* — The Farrell Law Firm, P.C.

(57)          ABSTRACT

The disclosure relates to a method and a device for device discovery using ultra-wideband (UWB). A method for a first UWB includes transmitting a control message including information on a contention window for contention-based access by using a UWB communication scheme; receiving a scheduling request message for scheduling-based access, in a slot in the contention window from a second UWB device by using the UWB communication scheme; and configuring a scheduled slot for the second UWB device, based on the scheduling request message. The scheduling request message may be used for in-band device discovery.

22 Claims, 12 Drawing Sheets

(56)  References Cited

U.S. PATENT DOCUMENTS

| | | | |
|---|---|---|---|
| 2015/0172391 A1 | 6/2015 | Kasslin et al. | |
| 2015/0304835 A1 | 10/2015 | Linde | |
| 2016/0302053 A1 * | 10/2016 | Park | H04W 72/0446 |
| 2019/0029043 A1 * | 1/2019 | Harada | H04L 25/0228 |
| 2019/0182647 A1 | 6/2019 | Qi et al. | |
| 2019/0281435 A1 | 9/2019 | Qi et al. | |
| 2020/0100283 A1 * | 3/2020 | Naguib | B60R 25/24 |
| 2020/0106877 A1 | 4/2020 | Ledvina et al. | |
| 2020/0137676 A1 | 4/2020 | Yoon et al. | |
| 2020/0182996 A1 | 6/2020 | Lee et al. | |
| 2021/0072373 A1 * | 3/2021 | Schoenberg | G01S 13/878 |

OTHER PUBLICATIONS

IEEE802.15.4z-2020, "IEEE Standard for Low-Rate Wireless Networks—Amendment 1: Enhanced Ultra Wideband (UWB) Physical Layers (PHYs) and Associated Ranging Techniques," in IEEE Std 802.15.4z-2020 (Amendment to IEEE Std 802.15.4-2020), vol. No. pp. 1-174, Aug. 25, 2020 (Year: 2020).*
International Search Report dated Mar. 25, 2022 issued in counterpart application No. PCT/KR2021/019749, 6 pages.
Kangjin Yoon et al., "UWB In-Band Discovery", IEEE P802.15 Working Group for Wireless Personal Area Networks (WPANs), Nov. 2022, 17 pages.
European Search Report dated May 10, 2024 issued in counterpart application No. 21911580.5-1215, 7 pages.

* cited by examiner

321

322

METHOD AND DEVICE FOR DEVICE DISCOVERY USING UWB

CROSS-REFERENCE TO RELATED APPLICATION(S)

This application is based on and claims priority under 35 U.S.C. § 119 to Korean Patent Application No. 10-2020-0183390, filed on Dec. 24, 2020, in the Korean Intellectual Property Office, the disclosure of which is incorporated herein by reference in its entirety.

BACKGROUND

1. Field

The disclosure relates to ultra-wideband (UWB) communication and, more particularly, to a method and a device for device discovery using UWB.

2. Description of the Related Art

The Internet has evolved to an Internet of things (IoT) network in which information between distributed elements such as objects is exchanged and processed. The Internet of everything (IoE), which is a combination of IoT technology and a big data processing technology through connection with a cloud server, etc., has emerged. For IoT implementation, technology elements such as sensing technology, wired/wireless communication and network infrastructure, service interface technology, and security technology are necessary. Recently, a sensor network for machine-to-machine (M2M) connection, M2M communication, machine-type communication (MTC), and the like, have been recently under development.

An IoT environment may provide an intelligent Internet technology (IT) service which creates a new value to human life by collecting and analyzing data generated among connected things. The IoT may be applied to a variety of fields including smart homes, smart buildings, smart cities, smart cars or connected cars, smart grids, health care, smart appliances and advanced medical services, through convergence and a combination of the existing information technology and various industries.

As various services are provided upon the development of a wireless communication system, a scheme for effectively providing such services is being demanded. For example, a ranging technology for measuring a distance between electronic devices using UWB may be used.

SUMMARY

The disclosure provides a method for performing device discovery using UWB. The disclosure also provides a method for selecting and managing an appropriate device discovery method according to a situation.

The disclosure provides a device discovery method using UWB, thereby resolving problems of a limit to the number of simultaneously connected devices and latency due to a device discovery method using Bluetooth low energy (BLE).

The disclosure provides a method for selecting and managing an appropriate device discovery method according to a situation, thereby achieving both low power and low latency.

A method of a first electronic device according to an aspect of the disclosure includes transmitting a control message for device discovery using a first communication scheme, the control message including information on a contention window; receiving a scheduling request message (SRM) for scheduling of a second electronic device, in the contention window from the second electronic device through the first communication scheme, the scheduling request message including identification information of the second electronic device; and configuring a scheduled resource for the second electronic device, based on the scheduling request message.

A method of a second electronic device according to another aspect of the disclosure includes receiving a control message for device discovery using a first communication scheme, the control message including information on a contention window; transmitting a scheduling request message for scheduling of the second electronic device, in the contention window to the first electronic device through the first communication scheme, the scheduling request message including identification information of the second electronic device; and performing a ranging procedure associated with the first communication scheme, by using a scheduled resource allocated based on the scheduling request message.

A first electronic device according to another aspect of the disclosure includes a transceiver; and a controller connected to the transceiver, wherein the controller is configured to transmit a control message for device discovery using a first communication scheme, the control message including information on a contention window; receive a scheduling request message for scheduling of a second electronic device, in the contention window from the second electronic device through the first communication scheme, the scheduling request message including identification information of the second electronic device; and transmit an initiation message for UWB ranging including allocation of a scheduled resource for the second electronic device, based on the scheduling request message.

A second electronic device according to another aspect of the disclosure includes a transceiver; and a controller connected to the transceiver, wherein the controller is configured to receive a control message for device discovery using a first communication scheme from a first electronic device, the control message including information on a contention window; and transmit a scheduling request message for scheduling of the second electronic device, in the contention window to the first electronic device through the first communication scheme, the scheduling request message including identification information of the second electronic device; and performing a ranging procedure associated with the first communication scheme, by using a scheduled resource allocated based on the scheduling request message.

A method of a first ultra-wideband (UWB) device according to another aspect of the disclosure includes transmitting a control message for contention-based access by using a UWB communication scheme, the control message including information on a contention window; receiving a scheduling request message for scheduling-based access, in a slot in the contention window from a second UWB device by using the UWB communication scheme; and configuring a scheduled slot for the second UWB device, based on the scheduling request message, wherein the scheduling request message is used for UWB-based device discovery.

A method of a second ultra-wideband device (UWB) according to another aspect of the disclosure includes receiving a control message for contention-based access from a first UWB device by using a UWB communication scheme, the control message including information on a contention window; and transmitting a scheduling request
message for scheduling-based access, in a slot in the con-
tention window to the first UWB device by using the UWB
communication scheme, wherein the scheduling request
message is used for UWB-based device discovery.

A first ultra-wideband (UWB) device according to another
aspect of the disclosure includes a transceiver; and a con-
troller, wherein the controller is configured to transmit a
control message for contention-based access by using a
UWB communication scheme, the control message includ-
ing information on a contention window; receive a sched-
uling request message for scheduling-based access, in a slot
in the contention window from a second UWB device by
using the UWB communication scheme; and configure a
scheduled slot for the second UWB device, based on the
scheduling request message, wherein the scheduling request
message is used for UWB-based device discovery.

A second ultra-wideband (UWB) device according to
another aspect of the disclosure includes a transceiver; and
a controller, wherein the controller is configured to receive
a control message for contention-based access from a first
UWB device by using a UWB communication scheme, the
control message including information on a contention win-
dow; and transmit a scheduling request message for sched-
uling-based access, in a slot in the contention window to the
first UWB device by using the UWB communication
scheme, wherein the scheduling request message is used for
UWB-based device discovery.

BRIEF DESCRIPTION OF THE DRAWINGS

The above and other aspects, features, and advantages of
the disclosure will be more apparent from the following
detailed description taken in conjunction with the accom-
panying drawings, in which.

DETAILED DESCRIPTION

Figure 1:
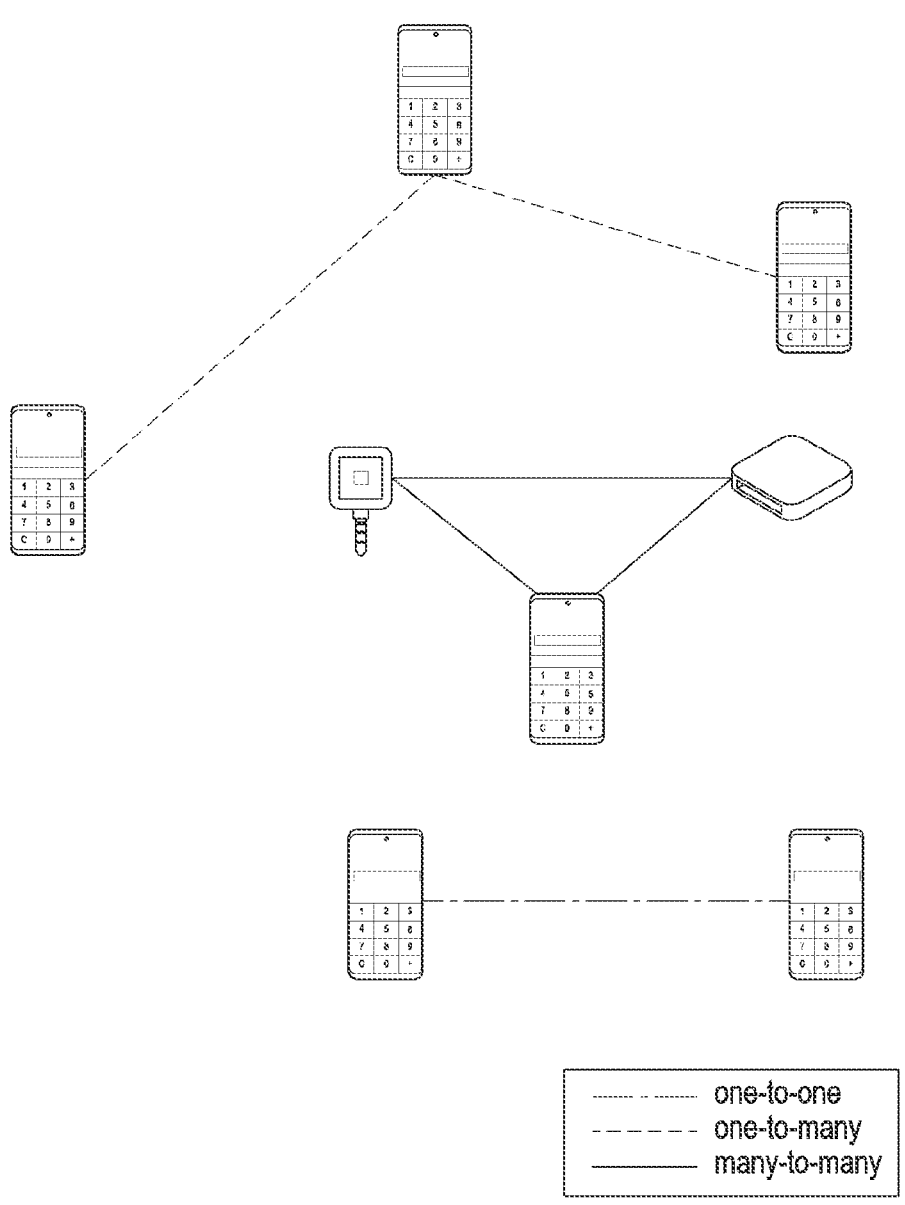
FIG. 1 illustrates a communication system to which the
present disclosure is applied.

Hereinafter, embodiments of the disclosure will be
described in detail with reference to the accompanying
drawings.

In describing embodiments of the disclosure, descriptions
related to technical contents well-known in the art and not
associated directly with the disclosure will be omitted. Such
an omission of unnecessary descriptions is intended to
prevent obscuring the main idea of the disclosure and more
clearly convey the main idea.

For the similar reasons, in the accompanying drawings,
some elements may be exaggerated, omitted, or schemati-
cally illustrated. Further, the size of each element may not
completely reflect the actual size.

The advantages and features of the disclosure and ways to
achieve them will be apparent by making reference to
embodiments as described below in detail in conjunction
with the accompanying drawings. However, the disclosure is
not limited to the embodiments set forth below, but may be
implemented in various different forms. The following
embodiments are provided only to completely disclose the
disclosure and inform those skilled in the art of the scope of
the disclosure, and the disclosure is defined only by the
scope of the appended claims. Throughout the specification
and drawings, the same or like reference numerals designate
the same or like elements.

Herein, it will be understood that each block of the
flowchart illustrations, and combinations of blocks in the
flowchart illustrations, can be implemented by computer
program instructions. These computer program instructions
can be provided to a processor of a general purpose com-
puter, special purpose computer, or other programmable data
processing apparatus to produce a machine, such that the
instructions, when executed by the processor of the com-
puter or other programmable data processing apparatus,
create means for implementing the functions specified in the
flowchart block or blocks. These computer program instruc-
tions may also be stored in a computer usable or computer-
readable memory that can direct a computer or other pro-
grammable data processing apparatus to function in a
particular manner, such that the instructions stored in the
computer usable or computer-readable memory produce an
article of manufacture including instruction means that
implement the function specified in the flowchart block or
blocks. The computer program instructions may also be
loaded onto a computer or other programmable data pro-
cessing apparatus to cause a series of operational steps to be
performed on the computer or other programmable appara-
tus to produce a computer implemented process such that the
instructions executed on the computer or other program-
mable apparatus provide steps for implementing the func-
tions specified in the flowchart block or blocks.

Further, each block of the flowchart illustrations may
represent a module, segment, or portion of code, which
includes one or more executable instructions for implement-
ing the specified logical function(s). It should also be noted
that in some alternative implementations, the functions
noted in the blocks may occur out of the order. For example,
two blocks shown in succession may in fact be executed
substantially concurrently or the blocks may sometimes be
executed in the reverse order, depending upon the function-
ality involved.

As used herein, the term "unit" may refer to a software
element or a hardware element, such as a field program-
mable gate array (FPGA) or an application specific inte-
grated circuit (ASIC), which performs a predetermined
function. However, "unit" does not always have a meaning
limited to software or hardware. The "unit" may be con-
structed either to be stored in an addressable storage medium
or to execute one or more processors. Therefore, the term
"unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more central processing units (CPUs) within a device or a security multimedia card. Further, according to some embodiments, the "unit" may include one or more processors.

The term "terminal" or "device" used herein may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include, but are not limited to, a cellular phone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet connection and browsing, and also portable units or terminals having a combination of such functions. In addition, the terminal may include, but is not limited to, an M2M terminal and an MTC terminal/device. The terminal may be also referred to as an electronic device or simply referred to as a device or apparatus herein.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, embodiments of the disclosure will also be described in detail in conjunction with the accompanying drawings. In the following description of embodiments of the disclosure, a communication system using UWB will be described by way of example, but the embodiments of the disclosure may be applied to other systems having similar technical backgrounds or characteristics. Examples thereof may include communication systems using Bluetooth™ or Zigbee®. Therefore, based on determinations by those skilled in the art, the embodiments of the disclosure may be applied to other communication systems through some modifications without significantly departing from the scope of the disclosure.

In general, a wireless sensor network technology is divided into wireless local area network (WLAN) technology and wireless personal area network (WPAN) technology according to a sensing distance. In this case, the WLAN corresponds to an IEEE 802.11-based technology, which enables access to a backbone network within a radius of about 100 m. The WPAN corresponds to an IEEE 802.15- based technology and includes Bluetooth™, ZigBee®, ultra-wideband (UWB), etc. A wireless network in which the above-mentioned wireless network technologies are implemented may include a plurality of electronic devices.

According to a definition by the Federal Communications Commission (FCC), UWB may mean a wireless communication technology in which a bandwidth of 500 MHz or higher is used, or a bandwidth corresponding to a central frequency is 20% or more. The UWB may mean a band itself to which UWB communication is applied. Hereinafter, a device discovery method is described based on a UWB communication scheme, but is merely an example, and various wireless communication technologies may be actually used.

Specific terms used in the following description are provided to help with understanding the disclosure, and the use of such specific terms may be changed into other forms without departing from the technical spirit of the disclosure.

An application dedicated file (ADF) may have, for example, a data structure in an application data structure which can host an application or application-specific data.

An application protocol data unit (APDU) may be a command and a response used in a case of communicating with an application data structure in a UWB device.

Application-specific data may have, for example, a file structure having an application level and a route level including UWB session data and UWB controlee information required for a UWB session.

A controller may be a ranging device which defines or controls a ranging control message (RCM) (or a control message).

A controlee may be a ranging device using a ranging parameter in an RCM (or a control message) received from the controller.

A dynamic scrambled timestamp sequence (STS) mode may correspond to an operation mode in which the STS does not repeat during a ranging session, unlike a static STS. In this mode, the STS may be managed by a ranging device, and a ranging session key for generating the STS may be managed by a secure component.

An applet may be, for example, an applet executed on a secure component including service data and UWB parameters. In the disclosure, the applet may be an FiRa applet defined by FiRa.

A ranging device may be a device which can perform UWB ranging. In the disclosure, the ranging device may be an enhanced ranging device (ERDEV) defined in the IEEE 802.15.4z, or an FiRa device defined by the FiRa consortium (FiRa). The ranging device may be referred to as a UWB device.

A UWB-enabled application may be an application for a UWB service. For example, the UWB-enabled application may be an application using a framework API for configuring an out-of-band (OOB) connector, a secure service, and/or a UWB service, for a UWB session. In the disclosure, the UWB-enabled application may be simply called an application or a UWB application. The UWB-enabled application may be an FiRa-enabled application defined by FiRa. A framework may be a component for providing access to a profile and individual UWB configuration and/or notification. The framework may be a collection of logical software components including, for example, a profile manager, an OOB connector, a secure service, and/or a UWB service. In the disclosure, the framework may be an FiRa framework defined by FiRa.

An OOB connector may be a software component for configuring an out-of-band (OOB) connection (for example, a BLE connection) between ranging devices. In the disclosure, the OOB connector may be an FiRa OOB connector defined by FiRa.

A profile may be a predefined set of UWB and OOB configuration parameters. In the disclosure, the profile may be an FiRa profile defined by FiRa.

A profile manager may be a software component for implementing an available profile in a ranging device. In the disclosure, the profile manager may be an FiRa profile manager defined by FiRa.

A service may correspond to implementation of a use case of providing a service to an end user.

A smart ranging device may be a ranging device which can implement an optional framework API. In the disclosure, the smart ranging device may be an FiRa smart device defined by FiRa.

A global dedicated file (GDF) may be at a root level of application-specific data including data necessary for configuration of a UWB session.

A framework API may be an API used by a UWB-enabled application for communication with a framework.

An initiator may be a ranging device initiating a ranging exchange.

An object identifier (OID) may be an identifier of an ADF in an application data structure.

An out-of-band (OOB) may correspond to an underlying wireless technology and may be data communication using no UWB.

A ranging data set (RDS) may be data (for example, a UWB session key, a session ID, etc.) required for configuration of a UWB session which requires confidentiality, authenticity, and integrity protection.

A responder may be a ranging device responding to an initiator in a ranging exchange. An STS may be a ciphered sequence for increasing integrity and accuracy of ranging measurement timestamps. The STS may be generated from a ranging session key.

A secure channel may be a data channel preventing overhearing and tampering.

A secure component may be, for example, an entity (for example, a secure element (SE) or a trusted execution environment (TEE)) having a defined security level interfacing with a UWB subsystem (UWBS) for the purpose of providing an RDS to the UWBS when a dynamic STS is used.

A secure element (SE) may be a tamper-resistant secure hardware component which can be used as a secure component in a ranging device.

Secure ranging may be ranging based on an STS generated through a strong encryption operation.

A secure service may be a software component for interfacing with a secure component such as an SE or a TEE.

A service applet may be an applet on a secure component handling a service-specific transaction.

Service data may be data defined by a service provider, which needs to be transferred between two ranging devices for service implementation.

A service provider may be an entity for defining and providing hardware and software required to provide a specific service for an end user.

A static STS mode corresponds to an operation mode in which an STS repeats for a session, and does not need to be managed by a secure component.

A secure UWB service (SUS) applet may be an applet on an SE communicating with an applet, for a search for data required to enable a secure UWB session with another ranging device. In addition, the SUS applet may transfer corresponding data (information) to a UWBS.

A UWB service may be a software component for providing access to the UWBS.

A UWB session may be period from when a controller and a controlee start communicating over UWB until they stop communicating. The UWB session may include ranging, data transfer, or both ranging and data transfer.

A UWB session ID may be an ID (for example, a 32-bit integer) for identifying a UWB session, shared between a controller and a controlee.

A UWB session key may be a key used for protection of a UWB session. The UWB session key may be used to generate an STS. In the disclosure, the UWB session key may be a UWB ranging session key (URSK), and may be simply called a session key.

A UWB subsystem (UWBS) may be a hardware component for implementing UWB PHY and MAC layers (specs). The UWBS may have an interface for a framework and an interface for a secure component for a search for an RDS. In the disclosure, the UWB PHY and MAC specs may be FiRa PHY and FiRa MAC specs defined by FiRa referring to IEEE 802.15.4/4z.

A UWB message may be a message including a payload information element (IE) transmitted by a UWB device (for example, an ERDEV).

A ranging message may be a message transmitted by a UWB device (for example, an ERDEV) in a UWB ranging procedure. For example, the ranging message may be a message such as a ranging initiation message (RIM), a ranging response message (RRM), a ranging final message (RFM), and a measurement report message (MRM) transmitted by a UWB device (for example, an ERDEV) transmitted by a UWB device (for example an ERDEV) in a specific phase of a ranging round. The ranging message may include one or more UWB messages. If necessary, a plurality of ranging messages may be merged into a single message. For example, in a case of non-deferred double-sided two-way ranging (DS-TWR), the RFM and the MRM may be merged into a single message in the final phase of ranging.

A payload information element (a payload IE), and may include a MAC payload of a UWB MAC frame, defined in IEEE 802.15.4/4z. The MAC payload may include a plurality of payload IEs.

A data transfer IE may be an additional payload IE for transmitting application data. The application data may be data transferred in an application or a framework in a higher layer of a UWB MAC layer. The data transfer IE may be used in a procedure of performing ranging between an initiator and a responder. In this case, a ranging message may include at least one a payload IE for ranging and a data transfer IE for application data transfer, or both the payload IE and the data transfer IE. For example, the data transfer IE may be included as a part of a payload IE of a MAC payload of an RIM for ranging, a RRM, an RFM, an MRM, and a ranging result report message (RRRM) and transferred. The data transfer IE may be transferred to the payload IE of the MAC payload of a downlink time difference of arrival (TDoA) message (DTM).

Scheduling-based ranging may be used for a ranging round in which controlees are scheduled by a controller to transmit a measurement report and/or an RFRAME in different slots. In the disclosure, the scheduling-based ranging may be also referred to as time-scheduled ranging. A scheduling mode in which the scheduling-based ranging is used may be referred to as a time-scheduled mode.

Contention-based ranging may be used when a controller does not know MAC addresses of controlees participating in a UWB session (a ranging session). In the contention-based ranging, the controller may be an initiator, and may perform ranging with the unknown UWB device. In the disclosure, a scheduling mode in which the contention-based ranging is used may be referred to as a contention-based mode.

The contention-based ranging may be used for a ranging round in which a controller determines a contention access period (CAP) size and notifies of the CAP size through a ranging control message. In the disclosure, the contention access period may be referred to as a contention window or a contention window period.

In the contention-based mode, a UWB device may operate as a controller and an initiator, and in this case, a ranging control phase (RCP) and a ranging initiation phase (RIP) may be merged into the RIP. Through allocation of the CAP size in a ranging phase (RP), a CAP period for a responder participating in the corresponding ranging round may be determined in units of ranging slots. Each responder may randomly determine a slot in a CAP to transmit an RRM. Messages used in the contention-based ranging may use STS packet configuration 1 (SP1) as RFRAME configuration.

Hybrid ranging may be used when there is a known controlee and an unknown controlee. As described above, the known controlee may be a controlee, the MAC address of which is known by a controller, and the unknown controlee may be a controlee, the MAC address of which is unknown by the controller. In the disclosure, the hybrid ranging may be referred to as hybrid-based ranging. A scheduling mode in which the hybrid ranging is used may be referred to as a hybrid-based mode.

In the hybrid-based mode, the controller may perform ranging with the known controlee in the scheduling-based mode, and perform ranging with the unknown controlee in the contention-based mode.

In the hybrid-based mode, a ranging round may include a ranging control phase (RCP) and a ranging phase (RP). The RP may include a contention free period for scheduling-based ranging (access) and a CAP for contention-based ranging (access). In the disclosure, a control message (a ranging control message) used in the RCP in the hybrid-based mode may be referred to as a ranging management message (RMM).

FIG. 1 illustrates a communication system to which the present disclosure is applied.

The communication system of FIG. 1 may be, for example, a UWB communication system performing communication using a communication technology such as UWB or Bluetooth™.

Referring to FIG. 1, electronic devices may perform communication in a one-to-one scheme, a one-to-many scheme, or a many-to-many scheme. In an embodiment, one electronic device in the communication system may perform a role of a BLE scanner, and another electronic device may perform a role of a BLE advertiser. It is apparent for those skilled in the art that an electronic device having performed the role of a BLE scanner in the relationship with a first electronic device may perform the role of a BLE advertiser in the relationship with a second electronic device.

In addition, one electronic device in the communication system may perform the role of a UWB controller, and another electronic device may perform the role of a UWB controlee. It is also apparent for those skilled in the art that an electronic device having performed the role of a UWB controller in the relationship with a first electronic device may perform the role of a UWB controlee in the relationship with a second electronic device.

In addition, one electronic device may perform both roles of the UWB controller (or the UWB controlee) and the BLE scanner (or the BLE advertiser). For example, the first electronic device may perform the roles of the UWB controller and the BLE advertiser, and the second electronic device may perform the roles of the UWB controlee and the BLE scanner. An operation of the communication system including the electronic devices described above is described with reference to FIG. 2.

Figure 2:
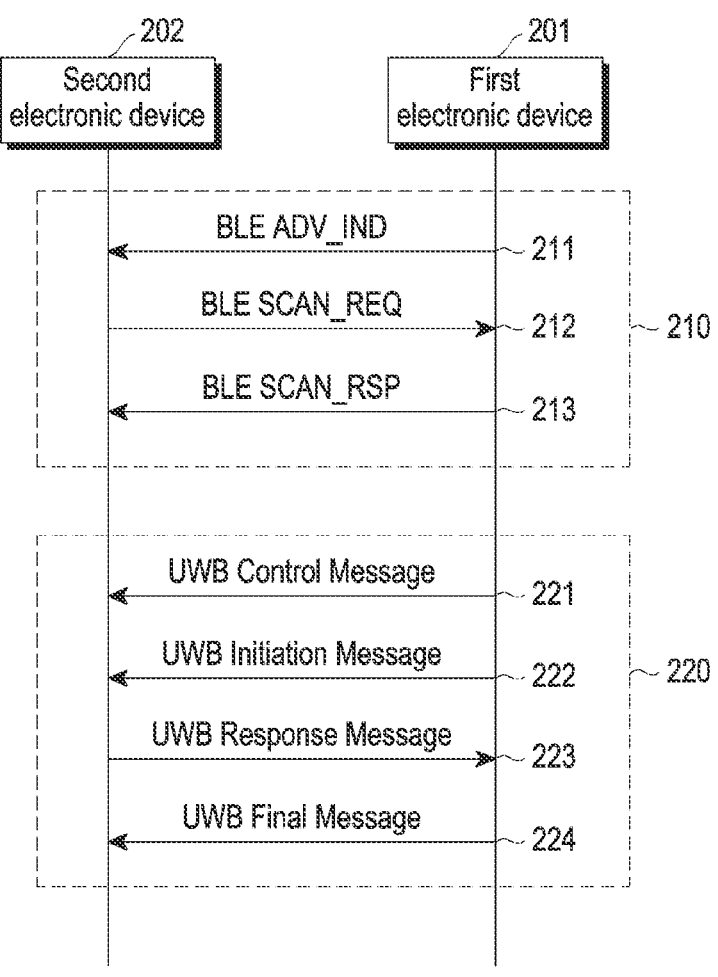
FIG. 2 illustrates a flow diagram of an operation method
of a communication system to which the present disclosure
is applied.

FIG. 2 illustrates a flow diagram of an operation method of a communication system to which the present disclosure is applied.

The communication system in FIG. 2 includes a first electronic device 201 and a second electronic device 202 for UWB communication. In an embodiment, the first electronic device 201 performs the roles of a UWB controller and a BLE advertiser, and the second electronic device 202 performs the roles of a UWB controlee and a BLE scanner.

In the disclosure, the UWB controller may correspond to an electronic device for controlling UWB ranging and defining a ranging parameter, and the UWB controlee may correspond to an electronic device using a ranging parameter received from (or defined by) the UWB controller. The UWB controller may be simply called a "controller", and the UWB controlee may be simply called a "controlee". In addition, the first electronic device may be called a "first UWB device", and the second electronic device may be called a "second UWB device".

(1) Device Discovery Procedure 210

In an embodiment of FIG. 2, the communication system performs a device discovery procedure 210 by using a BLE communication scheme. For example, the first electronic device (the BLE advertiser) 201 may transmit an advertising message/packet (for example, a BLE ADV_IND packet) for advertising, to the second electronic device (the BLE scanner) 202 in operation 211, the second electronic device 202 may transmit a scan request message/packet (for example, a BLE_SCAN_REQ packet) to the first electronic device 201, based on the advertising message/packet in operation 212, and the first electronic device 201 may transmit a response message/packet (for example, a BLE_SCAN_RSP packet) to the scan request message/packet to the second electronic device 202 in operation 213. Through the device discovery process, the first electronic device 201 may be discovered by the second electronic device 202. The BLE device discovery procedure follows the well-known BLE device discovery procedure, and the detailed description thereof will be omitted.

(2) UWB Ranging Procedure 220

Once the device discovery procedure is completed, the communication system may perform a UWB ranging procedure 220 to measure locations of electronic devices or the distance between the electronic devices by using a UWB communication scheme.

Meanwhile, the UWB ranging procedure 220 may also be applied to a UWB ranging procedure used when UWB in-band device discovery, which will be described later, is used as a device discovery method.

For example, in operation 221 (the ranging control phase (RCP)), the first electronic device (the UWB controller) 201 may transmit a UWB control message (for example, a ranging control message) to the second electronic device (the UWB controlee) 202. Through the operation, the first electronic device may control ranging and define ranging parameters. The ranging control message may correspond to a data frame carrying an advanced ranging control IE (ARC IE).

In operation 222 (the ranging initiation phase (RIP)), the first electronic device 201 may transmit a UWB initiation message (for example, a ranging initiation message (RIM)) to the second electronic device 202. The ranging initiation message may be the first message transmitted to initiate a ranging exchange. The first electronic device 201 may transmit a ranging control message and a ranging initiation message through a single message. For example, the first electronic device 201 may transmit the ranging initiation message including the ranging control message.

In operation 223 (the ranging response phase (RRP)), the second electronic device 202 may transmit a UWB response message (for example, a ranging response message (RPM)) corresponding to the UWB initiation message to the first electronic device 202. While an embodiment of FIG. 2 illustrates an example in which the UWB controller performs the role of an initiator initiating the ranging exchange, by transmitting the ranging initiation message, and the UWB controlee performs the role of a responder responding to the ranging initiation message received from the initiator, the disclosure is not limited to the example above. For example, unlike the illustration in FIG. 2, the UWB controlee may perform the role of an initiator, and the UWB controller may perform the role of a responder.

In operation 224 (the ranging final phase (RFP)), the first electronic device 201 may transmit a UWB final message (for example, a ranging final message (RFM)) to the second electronic device. Depending on the embodiment, the phase of operation 224 may be omitted. For example, the phase of operation 224 may be only used in a case of DS-TWR.

In an embodiment, the UWB ranging procedure may further include a measurement report phase (MRP). The measurement report phase may correspond to a phase of exchanging ranging information and/or related service information by electronic devices participating in the UWB ranging. The ranging message used in the measurement report phase may correspond to an MRM, an RRRM, or a control update message (CUM). In an embodiment, the MRM may be included in the RRM or the RFM and transmitted.

The UWB ranging procedure may be performed in one ranging round. A ranging round may correspond to a period of sufficient duration to complete one entire ranging-measurement cycle (ranging cycle) involving a set of UWB devices participating in the ranging exchange (a ranging round is a period of sufficient duration to complete one entire range-measurement cycle (ranging cycle) involving the set of ERDEVs participating in the ranging exchange). Each ranging round may include a plurality of ranging slots. A ranging slot may be a time period of sufficient duration to transit at least one frame (ranging frame (RFRAME) or a data frame).

In a certain ranging round, a plurality of ranging phases may be merged into a single phase. For example, the RCP and the RIP may be merged into a single phase. In addition, in a ranging round, some phases may be omitted. For example, in a ranging round for single sided two way ranging (SS-TWR), the RFP may be omitted. In addition, in a specific ranging round, the MRP may be omitted.

The detailed description of the above-described UWB ranging procedure may refer to the description of the IEEE Std 802.15.4z-2020 and the FiRa Consortium UWB MAC Technical Requirements.

In the above-described embodiment of FIG. 2, only a BLE communication scheme is used for device discovery, and thus, a UWB communication module for UWB communication may remain in an inactive state until the device discovery procedure is completed. In other words, until the device discovery procedure is completed, a UWB communication module which consumes a relatively large amount of power may remain in an inactive state, and only a UWB communication module which consumes a relatively small amount of power may remain in an active state. In addition, only when the device discovery is completed through an active BLE communication module, the UWB communication module is activated and the UWB ranging procedure can be performed. Accordingly, power consumption can be reduced.

However, in this case, latency due to a scan interval (for example, 3120 ms) of BLE discovery may occur, latency due to a simultaneous connection support limit (for example, simultaneous connection is allowed for up to four electronic devices) and a collision in a BLE communication scheme may occur, and a cost problem caused by mounting a BLE communication module in an electronic device, in addition to a UWB communication module, may occur.

Accordingly, device discovery only using the BLE communication scheme may be appropriate for a service (for example, a passive entry) requiring UWB ranging initiation without depending on a user input (for example, an app execution input), but may not be appropriate for a case in which ranging is initiated by a user input or a case in which a power source is always connected (for example, a point of service (POS) payment device) since the disadvantage of using the BLE communication scheme for device discovery outweighs the advantage thereof.

Therefore, a new scheme such as device discovery using a UWB communication scheme needs to be considered. In the disclosure, device discovery using the UWB communication scheme may be called UWB in-band device discovery, UWB in-band discovery, in-band device discovery, in-band discovery, or first device-discovery. Device discovery using the BLE communication scheme may be called BLE device discovery, UWB out-of-band device discovery, UWB out-of-band discovery, out-of-band device discovery, out-of-band discovery, or a second device-discovery.

The UWB in-band discovery may have two scenarios as described below.

Figure 3A:
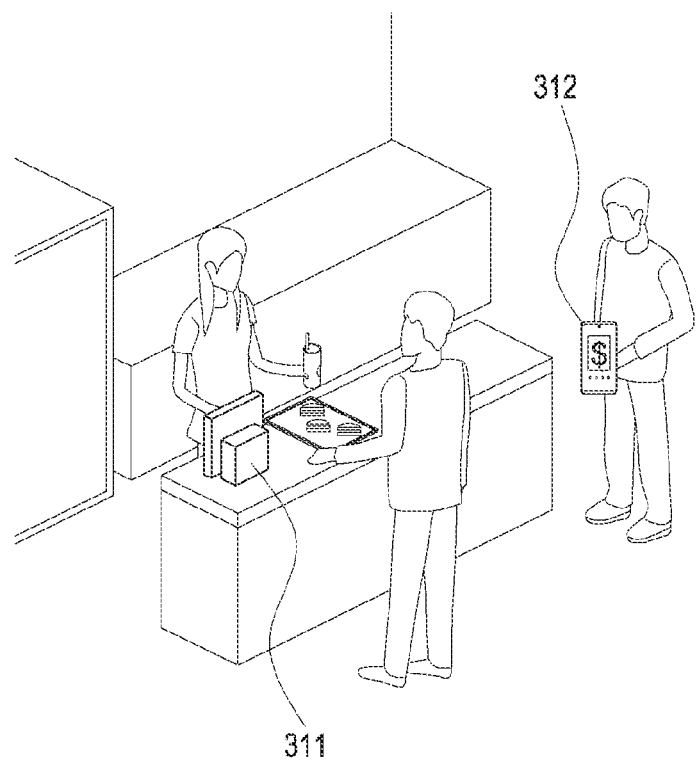
FIG. 3A illustrates a first scenario of UWB in-band
discovery according to an embodiment, and FIG. 3B illus-
trates a second scenario of UWB in-band discovery accord-
ing to an embodiment.
Figure 3B:
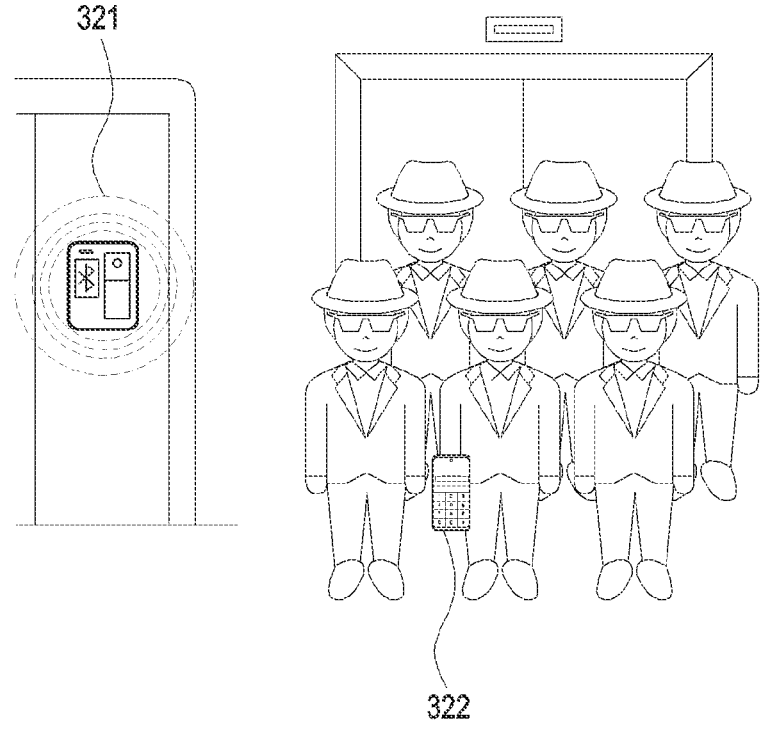

FIG. 3A illustrates a first scenario of UWB in-band discovery according to an embodiment, and FIG. 3B illustrates a second scenario of UWB in-band discovery according to an embodiment.

First Scenario (Scenario Using UWB Only)

Referring to FIG. 3A, in a first scenario, it is assumed that UWB ranging is performed only when an electronic device such as a POS device 311 is always connected to a power source and an application (app) associated with UWB communication is executed by an electronic device such as a user terminal 312. In this case, the focus needs to be on reducing latency at most, rather than reducing power consumption. Accordingly, the UWB in-band device discovery may be more appropriate than the BLE device discovery.

Second Scenario (Scenario Using Both BLE and UWB)

Referring to FIG. 3B, in a second scenario, for example, it is assumed that an electronic device such as a gate 321 installed in a door lock/elevator is always connected to a power source and an electronic device such as a user terminal 322 automatically performs UWB ranging (regardless of a user input). In this case, both a problem of power consumption at the user terminal end and a problem of reducing latency need to be considered. Accordingly, it may be appropriate to use UWB in-band device discovery and a part of an operation (for example, a BLE advertising packet transmission operation) of the BLE device discovery together.

Figure 4:
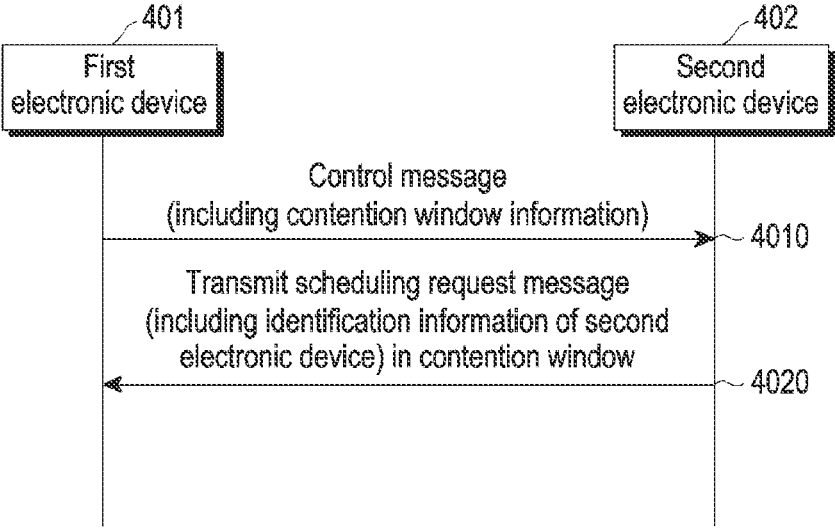
FIG. 4 is a flow diagram illustrating UWB in-band
discovery according to an embodiment.

FIG. 4 is a flow diagram illustrating UWB in-band discovery according to an embodiment. In an embodiment of FIG. 4, a first electronic device 401 corresponds to an electronic device (a first UWB device) performing the role of a UWB controller, and a second electronic device 402 corresponds to an electronic device (a second UWB device) performing the role of a UWB controlee.

(1) Operation 4010

In operation 4010, the first electronic device 401 may transmit a control message (a first control message) for a UWB ranging or for UWB in-band discovery of at least one electronic device by using a UWB communication scheme. The first electronic device 401 may periodically and aperiodically broadcast the first control message. The control message may transmit at an RCP or an RIP in a ranging round.

The first control message may include information on a contention window. The at least one electronic device may perform random access (contention-based access) to the first electronic device 401 through the contention window. In addition, the control message may include identification information (for example, a message ID) of the control message, identification information (for example, a unique value (e.g., a MAC address) for identifying a UWB controller) of the first electronic device 401, and/or identification information (for example, a unique value (e.g., a service UUID) indicating a target service) of the target service associated with the UWB.

The contention window may be used for contention-based access. A contention window or a period of the contention window may be also referred to as a contention access period (CAP).

The information on the contention window may include at least one of information on a contention window size, information on an ending slot of the contention window, information on a start slot and an ending slot of the contention window, or information on individual slot numbers of slots constituting the contention window. Through the information, the locations and/or the number of slots corresponding to the contention window, etc. may be identified. The contention window size may be adjusted by the controller in consideration of power consumption and contention resolution.

Table 1 shows an example of the control message including information on the contention window size. Table 1 may be an example of a content field of a payload IE of the control message. In this case, the payload IE may be included in a payload of a MAC frame for UWB communication and transmitted.

14

TABLE 1

| Parameter | | Size (bits) | Notes |
|---|---|---|---|
| Message Control | Ranging device management list length | 8 | Number of elements in the ranging device management list field |
| | Contention Window Presence | 1 | Presence of Contention Window Size field |
| | Reserved | 7 | |
| Ranging device management list | | Variable | List of ranging role, ranging slot index, and address for ranging device |
| Contention Window Size | | 0/8 (TBD) | Number of Ranging Slots which will be used for Contention Window |

Referring to Table 1, the control message may include a message control field, a ranging device management list field, and/or a contention window size field.

The control field of the control message may include a ranging device management list length field. The ranging device management list length field may include information related to a size of the ranging device management list field. For example, the ranging device management list length field may indicate the number of elements included in the ranging device management list field.

The ranging device management list field may include scheduling information for at least one ranging device (UWB device). For example, the ranging device management list field may include a list of ranging role, ranging slot index and/or address (e.g., MAC address) for the ranging device (e.g., controlee and/or responder). Through this ranging device management list field, the controlee/responder(s) may be scheduled by the controller. For example, when the ranging device management list field includes a list of MAC addresses of the controlee/responder(s), the controlee/responder(s) may be scheduled based on the order of the MAC addresses included in the list. For example, when the ranging device management list field includes a list arranged in the order of the MAC address (address A) of the controller A, the MAC address (address B) of the controller B, and the MAC address (address C) of the controller C, the controller A of the address A may respond in slot 1, the controller B of the address B may respond in slot 2 which is the next slot of the slot 1, and the controller C of the address C may respond in slot 3 which is the next slot of the slot 2.

The ranging device management list field may include element(s) (list element(s)) corresponding to a number indicated by the ranging device management list length field, and each element may include scheduling information for a corresponding ranging device. For example, each element of the ranging device management list field may include a ranging role, a ranging slot index (for example, a ranging slot index allocated to the corresponding ranging device), and/or an address (e.g., MAC address) for the corresponding ranging device (e.g., controlee and/or responder).

In an embodiment, the first electronic device (controller) may configure a ranging device management list field for the controlee based on the MAC address of the controlee included in a scheduling request message to be described later. In another embodiment, the first electronic device (controller) may configure the ranging device management list field based on the MAC address of the controlee responded within the contention window in the previous ranging block (or, round).

In the disclosure, the ranging device management list field may be referred to a device management list field or a responder management list (RML) field, and the ranging device management list length field may be referred to a device management list length field or RML size field.

The message control part (field) of the control message may include a contention window presence field. The contention window presence field corresponds to a 1-bit flag, and may indicate whether the contention window size field exists. For example, the contention window presence field may be configured with one of a first value indicating the presence of the contention window size field and a second value indicating the absence of the contention window size field.

When the contention window presence field indicates the presence of the contention window size field, the control message may include the contention window size field. The contention window size field may indicate the number of ranging slots to be used for the contention window. The size of the contention window may be identified through the contention window size field. The start slot (the ranging slot) of the contention window may be determined according to a predetermined reference. For example, a ranging slot immediately after the ranging slot in which the control message is transmitted may be determined as a start slot of the contention window. In another example, a ranging slot immediately after the allocated ranging slots (scheduled slots) for the scheduling-based access may be determined as a start slot of the contention window.

The control message in Table 1 above is merely an example, and the control message is not limited to the embodiment in Table 1.

Table 2 shows an example of a control message including information on an ending slot of a contention window. Table 2 may be an example of a content field of a payload IE of the control message. In this case, the payload IE may be included in a payload of a MAC frame for UWB communication and transmitted.

TABLE 2

| Parameter | | Size (bits) | Notes |
|---|---|---|---|
| Message Control | Ranging device management list length | 8 | Number of elements in the ranging device management field |
| | Contention Window Presence | 1 | Presence of Contention Window Ending Slot field |
| | Reserved | 7 | |
| Ranging device management list | | Variable | List of ranging role, ranging slot index, and address for ranging device |
| Contention Window Ending Slot | | 0/8 (TBD) | Index of the final Ranging Slot in Contention Window |

Referring to Table 2, the control message may include a message control field, a ranging device management list field, and/or a contention window size field.

The control field of the control message may include a ranging device management list length field. The ranging device management list length field may include information related to a size of the ranging device management list field. For example, the ranging device management list length field may indicate the number of elements included in the ranging device management list field.

The ranging device management list field may include scheduling information for at least one ranging device (UWB device). For example, the ranging device management list field may include a list of ranging role, ranging slot index and/or address (e.g., MAC address) for the ranging device (e.g., controlee and/or responder). Through this ranging device management list field, the controlee/responder(s) may be scheduled by the controller. For example, when the ranging device management list field includes a list of MAC addresses of the controlee/responder(s), the controlee/responder(s) may be scheduled based on the order of the MAC addresses included in the list. For example, when the ranging device management list field includes a list arranged in the order of the MAC address (address A) of the controller A, the MAC address (address B) of the controller B, and the MAC address (address C) of the controller C, the controller A of the address A may respond in slot 1, the controller B of the address B may respond in slot 2 which is the next slot of the slot 1, and the controller C of the address C may respond in slot 3 which is the next slot of the slot 2.

The ranging device management list field may include element(s) (list element(s)) corresponding to a number indicated by the ranging device management list length field, and each element may include scheduling information for a corresponding ranging device. For example, each element of the ranging device management list field may include a ranging role, a ranging slot index (for example, a ranging slot index allocated to the corresponding ranging device), and/or an address (e.g., MAC address) for the corresponding ranging device (e.g., controlee and/or responder).

In an embodiment, the first electronic device (controller) may configure a ranging device management list field for the controlee based on the MAC address of the controlee included in a scheduling request message to be described later. In another embodiment, the first electronic device (controller) may configure the ranging device management list field based on the MAC address of the controlee responded within the contention window in the previous ranging block (or, round).

In the disclosure, the ranging device management list field may be referred to a device management list field or a responder management list (RML) field, and the ranging device management list length field may be referred to a device management list length field or RML size field.

The message control part (field) of the control message may include a contention window presence field. The contention window presence field corresponds to a 1-bit flag, and may indicate whether the contention window ending slot field exists. For example, the contention window presence field may be configured with one of a first value indicating the presence of the contention window ending slot field and a second value indicating the absence of the contention window ending slot field.

When the contention window presence field indicates the presence of the contention window ending slot field, the control message may include the contention window ending slot field. The contention window ending slot field may indicate an index of the last ranging slot in the contention window. The start slot (the ranging slot) of the contention window may be determined according to a predetermined reference. For example, a ranging slot immediately after the ranging slot in which the control message is transmitted may be determined as a start slot of the contention window. In another example, a ranging slot immediately after the allocated ranging slots (scheduled slots) for the scheduling-based access may be determined as a start slot of the contention window.

The control message may further include information on a session (a UWB session) associated with the UWB.

Information on the session may include at least one of UWB session ID information, information on a UWB ranging method, information on a UWB ranging frame configuration, information of an angle of arrival (AoA) report, and information on a scrambled timestamp sequence (STS) configuration. Through the information, a parameter for UWB ranging and/or communication may be configured.

The control message in Table 2 above is merely an example, and the control message is not limited to the embodiment of Table 2.

Table 3 shows an example of a control message including information on a session associated with the UWB. Table 3 may be an example of a content field of a payload IE of the control message. In this case, the payload IE may be included in a payload of a MAC frame for UWB communication and transmitted.

TABLE 3

| Parameter | | Size (bits) | Notes |
| --- | --- | --- | --- |
| Message Control | Ranging device management list length | 8 | Number of elements in the ranging device management list field |
| | Contention Window Presence | 1 | Presence of Contention Window Size field |
| | UWB Configuration Presence | 1 | Presence of UWB Configuration information |
| | Reserved | 6 | |
| Ranging device management list | | Variable | List of ranging role, ranging slot index, and address for ranging device |
| Contention Window Size | | 0/8 (TBD) | Number of Ranging Slots which will be used for Contention Window |
| UWB Configuration | Ranging Method | 0/2 (TBD) | One way ranging (OWR) Single-sided two-way ranging (SS-TWR) Double-sided two-way ranging (DS-TOR) |
| | RFRAME Configuration | 0/2 (TBD) | SP0 SP1 SP3 |
| | AoA Report | 0/1 (TBD) | No AoA Report AoA Report |
| | STS Config | 0/1 (TBD) | Static STS Dynamic STS |

Referring to Table 3, the control message may include a message control field, a ranging device management list field, a contention window size field, and/or a UWB configuration field.

The control field of the control message may include a ranging device management list 5 length field. The ranging device management list length field may include information related to a size of the ranging device management list field. For example, the ranging device management list length field may indicate the number of elements included in the ranging device management list field.

The ranging device management list field may include scheduling information for at least one ranging device (UWB device). For example, the ranging device management list field may include a list of ranging role, ranging slot index and/or address (e.g., MAC address) for the ranging device (e.g., controlee and/or responder). Through this ranging device management list field, the controlee/responder(s) may be scheduled by the controller. For example, when the ranging device management list field includes a list of MAC addresses of the controlee/responder(s), the controlee/responder(s) may be scheduled based on the order of the MAC addresses included in the list. For example, when the ranging device management list field includes a list arranged in the order of the MAC address (address A) of the controller A, the MAC address (address B) of the controller B, and the MAC address (address C) of the controller C, the controller A of the address A may respond in slot 1, the controller B of the address B may respond in slot 2 which is the next slot of the slot 1, and the controller C of the address C may respond in slot 3 which is the next slot of the slot 2.

The ranging device management list field may include element(s) (list element(s)) corresponding to a number indicated by the ranging device management list length field, and each element may include scheduling information for a corresponding ranging device. For example, each element of the ranging device management list field may include a ranging role, a ranging slot index (for example, a ranging slot index allocated to the corresponding ranging device), and/or an address (e.g., MAC address) for the corresponding ranging device (e.g., controlee and/or responder).

In an embodiment, the first electronic device (controller) may configure a ranging device management list field for the controlee based on the MAC address of the controlee included in a scheduling request message to be described later. In another embodiment, the first electronic device (controller) may configure the ranging device management list field based on the MAC address of the controlee responded within the contention window in the previous ranging block (or, round).

In the disclosure, the ranging device management list field may be referred to a device management list field or a responder management list (RML) field, and the ranging device management list length field may be referred to a device management list length field or RML size field.

The message control part (field) of the control message may include a contention window presence field. The contention window presence field corresponds to a 1-bit flag, and may indicate whether the contention window size field exists. For example, the contention window presence field may be configured with one of a first value indicating the presence of the contention window size field and a second value indicating the absence of the contention window size field.

When the contention window presence field indicates the presence of the contention window size field, the control message may include the contention window size field. The contention window size field may indicate the number of ranging slots to be used for the contention window. The size of the contention window may be identified through the contention window size field. The start slot (ranging slot) of the contention window may be determined according to a predetermined reference. For example, a ranging slot immediately after the ranging slot in which the control message is transmitted may be determined as a start slot of the contention window. In another example, a ranging slot immediately after the allocated ranging slots (scheduled slots) for the scheduling-based access may be determined as a start slot of the contention window.

The message control part (field) of the control message may include a UWB configuration presence field. The UWB configuration presence field corresponds to a 1-bit flag, and may indicate whether the UWB configuration information field exists. For example, the UWB configuration presence field may be configured with one of a first value indicating the presence of the UWB configuration information field and a second value indicating the absence of the UWB configuration information field.

When the UWB configuration presence field indicates the presence of the UWB configuration information field, the control message may include the UWB configuration information field. The UWB configuration information field may include a ranging method field, a ranging frame (RFRAME) configuration field, an AoA report field, and/or an STS configuration field.

The ranging method field may correspond to a field indicating one of ranging methods. The ranging methods may include one-way ranging (OWR), a SS-TWR, and DS-TWR.

The RFRAME configuration field may indicate one of RFRAME configurations. The RFRAME configurations may include STS packet configuration 0 (SP0), STS packet configuration 1 (SP1), and STS packet configuration 3 (SP3).

The AoA report field may indicate whether an AoA report exists. For example, the AoA report field may be configured with one of a first value indicating that there is no AoA report and a second value indicating there is an AoA report.

The STS configuration field may indicate one of STS configurations. The STS configurations may include a static STS and a dynamic STS.

The control message in Table 3 is merely an example, and the control message is not limited to the embodiment of Table 3.

Depending on the embodiment, the information on the contention window, the identification information of the control message, the identification information of the electronic device for transmitting the control message, and the identification information of the target service may correspond to mandatory information included in the control message, and the information on the session may correspond to optional information included in the control message.

(2) Operation 4020

In operation 4020 of FIG. 4, the second electronic device 402 among at least one electronic device having received the control message may transmit a scheduling request message (SRM) for scheduling of the second electronic device 402 in the contention window by using a UWB communication scheme. The contention window may correspond to an RRP in the ranging round. The scheduling request message may be used to request scheduling-based access/ranging. The second electronic device may transmit the scheduling request message in any slot (a random slot) in the contention window. Depending on the embodiment, a plurality of second electronic devices may transmit a scheduling request message in the contention window. In this case, each of the second electronic devices can prevent consecutive collisions of the scheduling request message through a scheme of randomly selecting and transmitting a slot for transmission of the scheduling request message in the contention window. Alternatively, the consecutive collisions of the scheduling request message can be prevented through another collision avoidance scheme.

The scheduling request message may include at least one of identification information (for example, a message ID) of the scheduling request message or identification information (for example, a unique value (e.g., a MAC address) for identifying a UWB controlee) of the second electronic device 402. Through the information, the second electronic device 402 may be discovered. As such, the scheduling request message (or, information included in the scheduling request message) may be used for UWB in-band discovery.

In a case of scheduling-based ranging, a controller already knows a MAC address of a controlee (or a responder), and thus, a response message of the controlee used in the scheduling-based ranging does not necessarily include the MAC address (source address) of the controlee. However, in a case of contention-based ranging, the controller does not know a MAC address of the controlee (or the responder), and thus, a scheduling request message (response message) of the controlee used in the contention-based ranging should include the MAC address (source address) of the controlee (or the responder). Through the MAC address, the controlee (the second electronic device) may be discovered by the controller, and the scheduling-based ranging (access) may be performed between the controller and the controlee later.

The scheduling request message may further include identification information of the first electronic device 401 and identification information of a target service associated with the UWB (for example, a unique value (e.g., a service UUID) indicating the target service). The identification information of the first electronic device 401 of the scheduling request message and the identification information of the target service associated with the UWB may be the same as the identification information of the first electronic device 401 of the control message and the identification information of the target service associated with the UWB.

When the scheduling request message is included in the contention window, the first electronic device 401 may allocate a scheduled resource for the second electronic device 402. The first electronic device may allocate at least one scheduled slot for the second electronic device 402. The information (scheduling information) on the allocated scheduled resource (or slot) may be transmitted through a control message (a second control message) of the first electronic device 401. For example, the list of MAC address for the controlee(s) (or, responder(s)) to which the scheduled slot is allocated may be transmitted via the ranging device management list field. In this case, the controlee/responder(s) may be scheduled based on the order of the MAC addresses included in the list. For example, when the ranging device management list field includes a list arranged in the order of the MAC address (address A) of the controller A, the MAC address (address B) of the controller B, and the MAC address (address C) of the controller C, the controller A of the address A may respond in slot 1, the controller B of the address B may respond in slot 2 which is the next slot of the slot 1, and the controller C of the address C may respond in slot 3 which is the next slot of the slot 2.

The second control message may be included in a transport block (first ranging period) subsequent to a transport block (second ranging period) including the first control message. In this case, the second electronic device 402 discovered through a current transport block may be scheduled in the next transport block. Through the allocation of the scheduled slot, stable ranging and efficiency of the contention window can be achieved. The second electronic device 402 may transmit the scheduling request message until scheduling is performed through the control message 5 of the first electronic device 401.

The scheduling request message may be included in a ranging response message (RRM) and transmitted. In this case, the RRM may include a measurement report message (MRM) (for example, MRM type 3).

The MRM may include a header IE and/or a payload IE. Table 4 shows an example of a content field of a header IE of an MRM below.

TABLE 4

| Parameter | Size (octets) | Notes |
|---|---|---|
| Vendor OUI | 3 | 0x5A18FF |
| Padding | 8 | Known padding for integrity check |
| Session ID | 4 | UWB session identifier |
| STS index | 4 | STS index of the current ranging slot |

Table 5 shows an example of a content field of a payload IE of an MRM below.

TABLE 5

| Parameter | Size (bits) | Notes |
|---|---|---|
| Vendor OUI | 24 | 0x5A18FF |
| UWB Message ID | 4 | 0x4 = Measurement Report Message |
| Reserved | 4 | Reserved for future use |
| Message Control | 8 | Configuration of the message |
| Reply Time | 32 | The Reply Time value Indicates the time difference between RIM from the initiator and RRM from the Responder. The Reply Time value unit is $2^{-7}$ of the 499.2 MHz chipping period, which is approximately 15.65 ps. |
| AoA Azimuth Result | 0/16 | AoA azimuth result |
| AoA Elevation Result | 0/16 | AoA elevation result |
| AoA Azimuth FOM | 0/8 | AoA azimuth figure of merit (FOM) |
| AoA Elevation FOM | 0/8 | AoA elevation FOM |

In Table 5, the MRM may include AoA-related information. For example, the MRM may include an AoA azimuth result field in which an AoA azimuth result is provided, an AoA elevation result field in which an AoA elevation result is provided, an AoA azimuth figure of merit (FOM) field in which an AoA azimuth FOM is provided, and/or an AoA elevation FOM field in which an AoA elevation FOM is provided.

In an embodiment, whether the AoA azimuth result field, the AoA elevation result field, the AoA azimuth FOM field, and the AoA elevation FOM field exist may be indicated by the message control field.

Table 6 shows an example of a message control field in a content field of a payload IE of a MRM below.

TABLE 6

| Parameter | Size (bits) | Notes |
|---|---|---|
| AoA Azimuth Result Present | 1 | Presence of AoA azimuth result field |
| AoA Elevation Result Present | 1 | Presence of AoA elevation result field |

TABLE 6-continued

| Parameter | Size (bits) | Notes |
|---|---|---|
| AoA FOM Present | 1 | Presence of FOM field for AoA azimuth field and/or AoA elevation field |
| Reserved | 5 | Reserved for future use |

Figure 5:
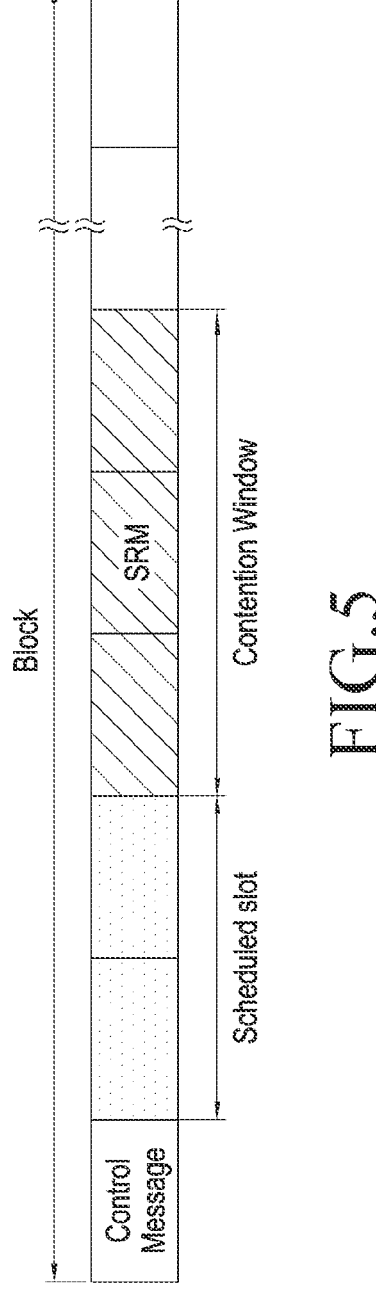
FIG. 5 illustrates a transport block for UWB in-band
discovery according to an embodiment.

FIG. 5 illustrates a transport block for UWB in-band discovery according to an embodiment.

In FIG. 5, a transport block may correspond to a ranging round for contention-based ranging and hybrid ranging, or may correspond to a ranging block including the ranging round.

Referring to FIG. 5, a transport block used for UWB in-band discovery may include a plurality of slots.

In an embodiment, the transport block may have a structure that is identical to that of a ranging block for UWB ranging. In this case, the transport block may include a plurality of ranging rounds, and each ranging round may include a plurality of ranging slots. The ranging round corresponds to a period sufficient to complete one entire range-measurement cycle including a set of electronic devices participating in a ranging exchange, and the ranging slot corresponds to a period sufficient for transmission of at least one ranging frame (RFRAME).

In another embodiment, the transport block may have a structure different from that of the ranging block. For example, the transport block may have a structure of a block newly defined for UWB in-band discovery.

Referring to FIG. 5, a control message may be transmitted through a first slot of the transport block. For example, the control message may be transmitted through the first slot of the transport block or the first slot of each ranging round in the transport block. In another example, the control message may be transmitted through the first n slots in the transport block or one slot determined according to a pre-configured reference from among the first n slots of each ranging round in the transport block.

The control message may correspond to a ranging control message (RCM) for configuring a ranging parameter or may be included in the RCM. The control message may also be a message newly defined separately from the RCM.

Referring to FIG. 5, at least one of slots subsequent to the first slot including the control message may be allocated as a contention window.

For example, as shown in FIG. 5, three slots from a slot which comes two slots after the first slot including the control message may be allocated as a contention window.

In another example, three slots from a slot immediately after the first slot including the control message may be allocated as a contention window. In this case, a start slot of the contention window is specified as a slot immediately after a slot in which the control message is transmitted, and thus, even when only information on the size of the contention window or information on an ending slot of the contention window is transferred, the location and the size of the contention window can be identified.

The transport block may include at least one scheduled slot for scheduling-based access (ranging) of at least one electronic device. For example, slots between the first slot and slots of the contention window may be allocated as scheduled slots for specific electronic devices. As described above, information on the scheduled slot may be transmitted through the control message. In this case, as illustrated in FIG. 5, a start slot of the contention window may be determined as a slot immediately after the slots allocated as scheduled slots.

Referring to FIG. 5, the scheduling request message may be transmitted from any one slot (a random slot) in the contention window, i.e., may be randomly transmitted. For example, as illustrated in FIG. 5, a scheduling request message for a second electronic device may be transmitted in the second slot of the contention window. A collision may occur when scheduling request messages from a plurality of electronic devices are transmitted in the same slot in the contention window. However, as described above, a transport slot of the scheduling request message in the contention window is randomly selected, and thus consecutive collisions can be prevented.

A UWB in-band discovery procedure described with reference to FIGS. 4 and 5 through the above-described first scenario in FIG. 3A is described as an example. First, a POS device (a first electronic device) may periodically transmit a control message, a user who desires to make a payment may execute an app of a user terminal (a second electronic device), the user terminal having received the control message may perform random access in a contention window, and the POS device may perform scheduling for the user terminal.

Figure 6:
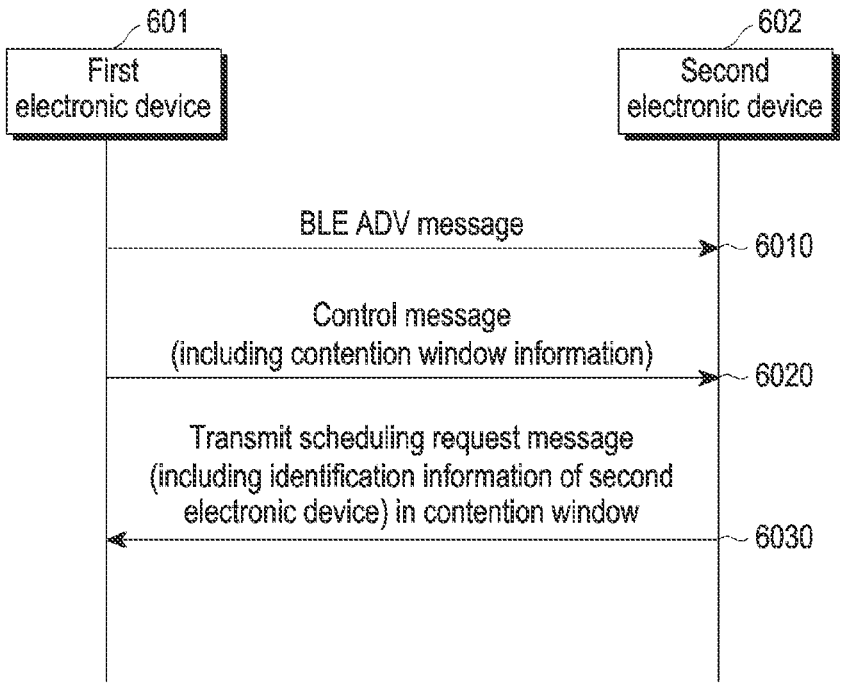
FIG. 6 is a flow diagram illustrating UWB in-band
discovery according to an embodiment.

FIG. 6 is a flow diagram illustrating UWB in-band discovery according to an embodiment. In FIG. 6, a first electronic device 601 corresponds to an electronic device (a first UWB device) performing the role of a UWB controller, and a second electronic device 602 corresponds to an electronic device (a second UWB device) performing the role of a UWB controlee.

In FIG. 6, unlike the embodiment of FIG. 4, a BLE advertising message/packet is used for UWB in-band discovery. The embodiment of FIG. 6 is different from a normal BLE device discovery/connection procedure, in which both device discovery and connection are performed in a BLE communication scheme through a BLE advertising packet, in that, in the embodiment of FIG. 6, a BLE advertising packet is received and then device discovery is performed through the above-described UWB in-band discovery scheme, without separately exchanging an additional BLE message (for example, a BLE SCAN REQ/RSP message). Accordingly, in the case of the embodiment of FIG. 6, it is advantageous in that latency due to a collision between BLE messages and a limit of simultaneous connection of the BLE messages do not occur. The embodiment of FIG. 6 may be appropriate for a case where the controller flexibly configures a UWB parameter, or a case where the controlee automatically executes ranging (for example, a scenario in FIG. 3B).

In operation 6010, the first electronic device 601 may transmit a BLE advertising message/packet. The BLE advertising message may include at least one of identification information of the first electronic device 601 and identification information of a target service associated with the UWB. In addition, the BLE advertising message may include UWB parameter information for a parameter configured for UWB communication. The UWB parameter information may include at least one of a channel number, a preamble code index, a physical (PHY) layer parameter set, a session ID, or a MAC address. A communication environment for UWB communication may be set up through the UWB parameter information above.

In operation 6020, the first electronic device 601 may transmit a control message for UWB in-band discovery of at least one electronic device. The first electronic device 601 may periodically or aperiodically broadcast the control message. The description of operation 6020 and the control message may refer to the description of operation 4010 and the control message in FIG. 4.

In operation 6030, the second electronic device 602 among the at least one electronic device may transmit a scheduling request message for scheduling of the second electronic device 602 in the contention window. The second electronic device 602 may transmit the scheduling request message in a random slot in the contention window. The description of operation 6030 and the scheduling request message may refer to the description of operation 4020 and the scheduling request message in FIG. 4.

A UWB in-band discovery procedure described with reference to FIG. 6 through the above-described second scenario in FIG. 3B is described as an example below. First, a gate device (a first electronic device) may periodically transmit a BLE advertising packet, a user terminal (a second electronic device) having received the BLE advertising packet may activate a UWB module, the user terminal may receive a control message and perform random access in the contention window, and the gate device may perform scheduling for the user terminal.

Hereinafter, an embodiment in which an electronic device including both a BLE communication module and a UWB communication module simultaneously or selectively manages a BLE device discovery scheme or a UWB device discovery (UWB in-band discovery) scheme is described.

As described above, the UWB in-band discovery is more advantageous than the BLE device discovery in view of simultaneous device discovery, but requires more power consumption. Accordingly, it is important to select a device discovery scheme appropriate for a situation, and to this end, the UWB controller may provide an indicator indicating a device discovery scheme to be used. In this case, when the use of the UWB in-band discovery of the controller is identified/detected through the indicator, the UWB controlee may perform the UWB in-band discovery instead of the BLE discovery. Hereinafter, a method for selectively managing UWB in-band discovery is described with reference to FIG. 7.

Figure 7:
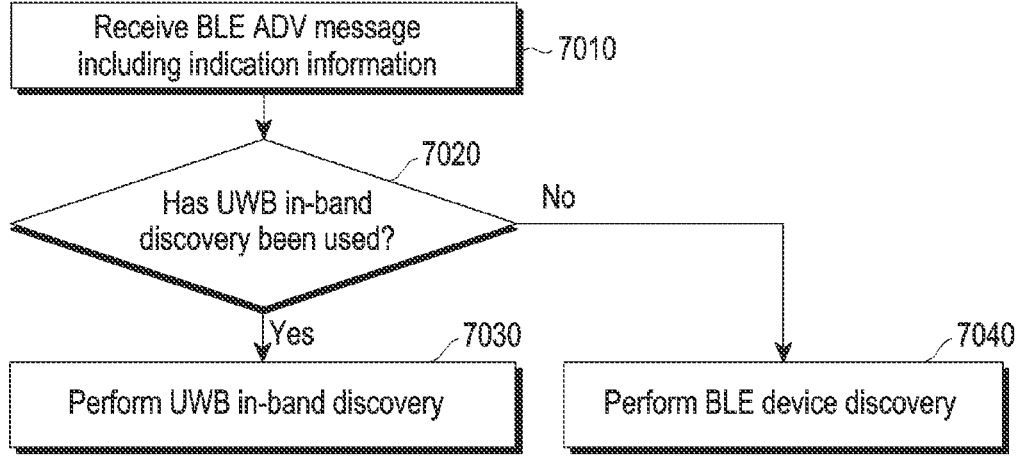
FIG. 7 is a flowchart indicating a method for selectively
managing UWB in-band discovery according to an embodi-
ment.

FIG. 7 is a flowchart indicating a method for selectively managing UWB in-band discovery according to an embodiment.

In FIG. 7, a first electronic device corresponds to an electronic device (a first UWB device) performing the role of a UWB controller, and a second electronic device corresponds to an electronic device (a second UWB device) performing the role of a UWB controlee.

In FIG. 7, in addition to the embodiment of FIG. 6, a BLE advertising message/packet may further include indication information indicating whether BLE device discovery is used, whether UWB device discovery (UWB in-band discovery) is used, or whether BLE device discovery and UWB device discovery are used together.

In step 7010, the second electronic device may receive a BLE advertising message/packet. The BLE advertising message may include indication information indicating whether BLE device discovery is used, whether UWB device discovery (UWB in-band discovery) is used, or whether the BLE device discovery and the UWB device discovery are used together. Table 7 shows an example of the BLE advertising message.

TABLE 7

| Field Name | Size (bit) | Note |
|---|---|---|
| Inband Discovery Indicator | 1 | 0: BLE Discovery will be used 1: UWB Inband Discovery will be used |
| UWB Channel | 0/3 | Channel 5, 6, 8, 9, 10, 12, 13, 14 |
| UWB Preamble Code Index | 0/3 | Code index 1~8 |
| UWB PHY Parameter Set | 0/2 | BPRF PHY parameter set 1~4 |

Referring to FIG. 7, the BLE advertising message may include indication information, channel field/information (a UWB channel), a preamble code index (a UWB preamble code index), and/or a physical layer parameter set (a UWB PHY parameter set). The indication information may be referred to as an in-band discovery indicator, in-band discovery indication information, or an indicator.

In an embodiment, the indication information corresponds to a 1-bit flag, and may be configured with, for example, one of a first value (for example, 0) indicating that the BLE discovery is to be used and a second value (for example, 1) indicating that the UWB in-band discovery is to be used.

In another embodiment, the indication information corresponds to a 2-bit flag, and may be configured with one of a first value indicating that the BLE discovery is to be used (for example, 00), a second value (for example, 01) indicating that the in-band discovery is to be used, or a third value (for example, 10 or 11) indicating that the BLE discovery and the in-band discovery are used together.

The channel information corresponds to information having a 0-bit size or 3-bit size, and may indicate a UWB channel number (for example, 5, 6, 8, 9, 10, 12, 13, or 14).

The preamble code index corresponds to a field having a 0-bit size or 3-bit size, and may indicate a UWB code index (for example, 1 to 8).

The physical layer parameter set corresponds to a field having a 0-bit size or 2-bit size, and may indicate a base pulse repetition frequency (BPRF) PHY parameter set (for example, 1 to 4).

When a value of the indication information is 0, the channel information, the preamble code index, and the physical layer parameter set may not be included in the BLE advertising message.

The above-described BLE advertising message in Table 7 is merely an example, and the BLE advertising message is not limited to the embodiment in Table 7.

In step 7020, the second electronic device may identify (determine) whether the UWB in-band discovery is used, based on the indication information. The second electronic device may identify whether the BLE discovery is used or the UWB in-band discovery is used, based on the value of the indication information.

In step 7030, when the use of the UWB in-band discovery is identified, the second electronic device may perform a UWB in-band discovery procedure with the first electronic device. This may refer to the UWB in-band discovery procedure in FIG. 4.

In step 7040, when the use of the BLE discovery is identified, the second electronic device may perform a BLE discovery procedure with the first electronic device. This may refer to the BLE device discovery procedure in FIG. 2.

Hereinafter, an embodiment relating to switching of a device discovery scheme and adjustment of a contention window size will be described.

In a state in which the BLE discovery scheme is applied, detection of a collision in a response to the BLE advertising message (for example, a case where no BLE_SCAN_REQ message/packet for BLE_ADV_IND message/packet is received but energy is detected) repeats a pre-configured number (for example, N) or more of times, the first electronic device may switch the device discovery scheme from the BLE discovery scheme to the UWB in-band discovery scheme. In this case, the first electronic device may configure a value of indication information with a value indicating the use of the UWB in-band discovery.

In a state in which the UWB in-band discovery scheme is applied, when a UWB ranging session ends, or when there are a pre-configured number (for example, N) or more of repeating blocks in which a signal (frame/message) of a controlee in the contention window is no longer received, the first electronic device may switch the device discovery scheme from the UWB in-band discovery scheme to the BLE discovery scheme. In this case, the first electronic device may configure a value of indication information with a value indicating the use of BLE discovery.

In an embodiment, when a ratio of slots used in the contention window (used slots) is greater than or equal to a pre-configured ratio (for example, M %), the first electronic device may extend the contention window size. In another embodiment, when a ratio of slots used in the contention window (used slots) is less than or equal to a pre-configured ratio (for example, M %), the first electronic device may reduce the contention window size. Here, the used slots may correspond to slots in which no collision over the scheduling request message (SRM) is generated, and the ratio of the used slots may correspond to a collision ratio. Accordingly, according to the collision ratio (the ratio of used slots), the contention window size may be dynamically/adaptively adjusted by the controller.

Hereinafter, a scenario of selectively managing UWB in-band discovery is described.

When a UWB controller does not use a UWB communication module, the UWB controller may configure an indicator of a BLE ADV message with a first value (for example, 0) and inform the UWB controlee of disuse of the UWB in-band discovery.

For example, when many users get off an elevator suddenly, a collision between response messages (SCAB_REQ) to the BLE ADV may occur.

In this case, the UWB controller may detect the collision and set a value of an indicator with a second value (for example, 1) to inform the UWB controlee of the use of the UWB in-band discovery. In addition, the UWB controller may provide information on the contention window through a control message.

The UWB controlee having received the BLE ADV may identify the use of the UWB in-band discovery, and activate the UWB module to receive the control message. Thereafter, the UWB controlee may transmit a scheduling request message including identification information (for example, a MAC address) of the UWB controlee, in the contention window.

For example, when the scheduling request message is not received in the contention window any longer, or when the UWB session ends, the UWB controller may configure the disuse of the UWB in-band discovery.

Hereinafter, a method for preventing a collision of a frame (message) of a UWB controller will be described with reference to FIG. 8. For example, when each of a plurality of controllers transmits a control message in the same slot, a collision occurs, which may cause the above-described UWB in-band discovery not to be performed. In this case, a method for preventing consecutive collisions needs to be considered. Two methods for preventing the consecutive collisions of the controller frame are described herein.

One is a method (random transmission method) for randomly transmitting the controller frame in a window for a controller. The other is a method (slot hopping transmission method) for transmitting the controller frame by using a slot hopping scheme in a window for a controller.

Figure 8:
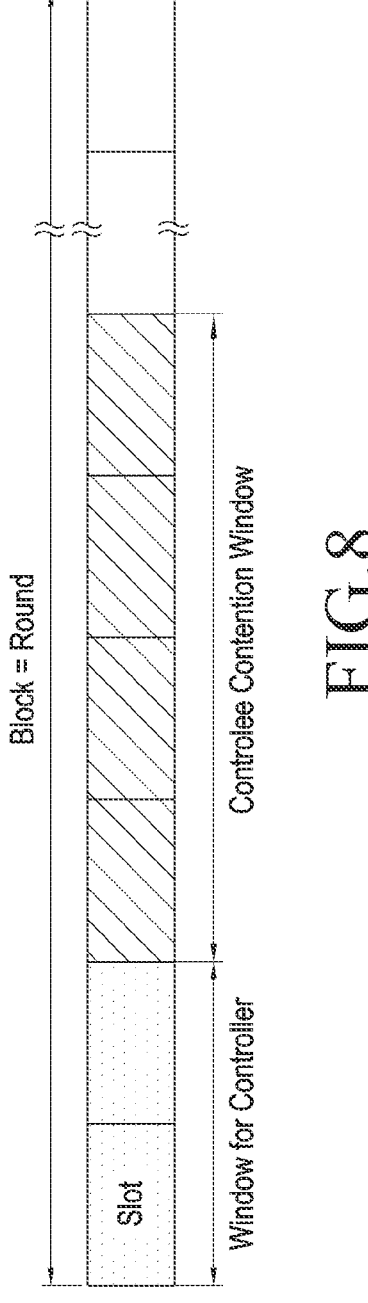
FIG. 8 illustrates a transport block or round including a
contention window for a controlee and a window for a
controller according to an embodiment.

FIG. 8 illustrates a transport block or round including a contention window for a controlee and a window for a controller according to an embodiment.

As illustrated in FIG. 8, the transport block may correspond to a round (a ranging round). For example, the transport block may correspond to a ranging round for contention-based ranging (or hybrid ranging).

Referring to FIG. 8, the transport block or round may include a window for a controller (a controller window) and a contention window for a controlee (a controlee contention window). The transport block of FIG. 8 may have a structure identical to that of the transport block or round of FIG. 5.

(1) Random Transmission Method

When a random transmission method is applied, the controller may randomly select a slot for transmission of a controller frame (for example, a frame including a control message) in a controller window. In this case, the controlee contention window may start right after a slot in which the controller frame (message) is transmitted.

When the random transmission method is applied, the controlee should listen to the entire controller window. The frame (message) is transmitted in a slot randomly selected in the controller window, and thus, the controlee should observe all slots in the controller window.

When the random transmission method is applied, it is advantageous in that an operation is simple since a calculation, such as a hopping sequence calculation, is not required, but it is disadvantageous in that the controlee should observe several slots.

(2) Slot Hopping Transmission Method

When a slot hopping transmission method is applied, the controller may select a slot for transmission of a controller frame, based on a pre-configured hopping sequence equation. In this case, similar to the embodiment of the random transmission method, the controlee contention window may start right after a slot in which the controller frame (message) is transmitted.

The hopping sequence equation may correspond to Equation (1) below.

$$S(\text{BlockIndex},\text{SessionID},N_{Round})=((AES(\text{BlockIndex},\text{SessionID})\&0\text{xFFFF})N_{Round})\gg16 \qquad \text{Equation (1)}$$

Here, $N_{Round}$ indicates the number of ranging rounds in a ranging block, and» indicates a bitwise right shift operator. AES-128 should be used for an advanced encryption standard (AES) function. BlockIndex and SessionID should be used for plain text and a key, respectively. The description of the hopping sequence and Equation (1) may refer to the description of the IEEE Std 802.15.4z-2020 and the FiRa Consortium UWB MAC Technical Requirements.

When the slot hopping transmission method is applied, the controlee may only observe slots selected based on a pre-configured hopping sequence equation. The frame (message) is transmitted in the slot selected based on the predetermined equation, rather than a random slot, and thus, the controlee may observe the corresponding slot only.

When the slot hopping transmission method is applied, it is advantageous in that the controlee may observe only one slot, but it is disadvantageous in that a calculation such as a hopping sequence calculation is required.

Figure 9:
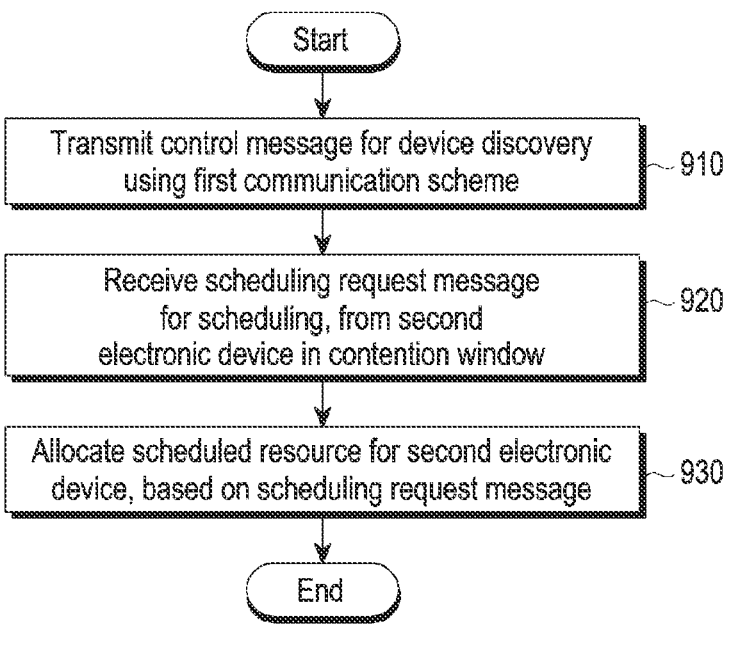
FIG. 9 is a flowchart illustrating a method of a first
electronic device according to an embodiment.

FIG. 9 is a flowchart illustrating a method of a first electronic device according to an embodiment.

In FIG. 9, a first electronic device corresponds to an electronic device (a first UWB device) performing the role of a UWB controller, and a second electronic device corresponds to an electronic device (a second UWB device) performing the role of a UWB controlee. A detailed description of each operation in FIG. 9 may refer to the above-described description in FIGS. 1 to 8.

The first electronic device may transmit a control message for UWB ranging or device discovery using a first communication scheme, through the first communication scheme in step 910. The control message may include information on a contention window.

The first electronic device may receive a scheduling request message for scheduling of a second electronic device in the contention window from the second electronic device through the first communication scheme in step 920. The scheduling request message may include identification information of the second electronic device.

The first electronic device may allocate a scheduled resource for the second electronic device, based on the scheduling request message in step 930.

The first electronic device may transmit, through a second communication scheme that is different from the first communication scheme, an advertising message including indication information indicating whether device discovery using the first communication scheme is used or device discovery using the second communication scheme is used.

When there are a pre-configured number or more of repeating blocks in which no scheduling request message is received, in the contention window, the indication information may be changed from a first value indicating use of device discovery using the first communication scheme or a third value indicating use of both device discovery using the first communication scheme and device discovery using the second communication scheme to a second value indicating use of device discovery using the second communication scheme. When a pre-configured number or more collisions of a response message corresponding to the advertising message are detected, the indication information may be changed from the second value indicating use of device discovery using the second communication scheme to the first value indicating use of device discovery using the first communication scheme or the third value indicating use of both device discovery using the first communication scheme and device discovery using the second communication scheme.

The information on the contention window may include at least one of information on the size of the contention window, information on an ending slot of the contention window, information on a start slot and the ending slot of the contention window, or information on individual slot numbers of slots constituting the contention window.

The size of the contention window may be adjusted based on a ratio of used slots in the contention window.

The control message may include at least one of identification information of the control message, identification information of the first electronic device, or identification information of a service associated with the first communication scheme.

The control message may further include information on a session associated with the first communication scheme, and the information on the session may include at least one of information on a ranging method associated with the first communication scheme, information on a ranging frame configuration associated with the first communication scheme, information on an AoA report associated with the first communication scheme, or information on an STS configuration associated with the first communication scheme.

The scheduling request message may further include identification information of the scheduling request message.

The scheduling request message may further include at least one of the identification information of the first electronic device and the identification information of the service associated with the first communication scheme.

The control message may include a first slot in a first transport slot, the scheduling request message may include a random slot in the contention window in the first transport block, the random slot being subsequent to the first slot, and the scheduled resource may correspond to at least one slot of a second transport block subsequent to the first transport block.

The first communication scheme may correspond to a communication scheme using UWB, and the second communication scheme may correspond to a communication scheme different from the UWB, for example, a communication using another communication scheme (for example, a communication scheme using a narrowband) using IEEE 802.15.4 or BLE. The second communication scheme may correspond to various types of communication schemes different from the UWB satisfying a feature of the second communication scheme in the disclosure, and is not limited to the embodiment above.

Figure 10:
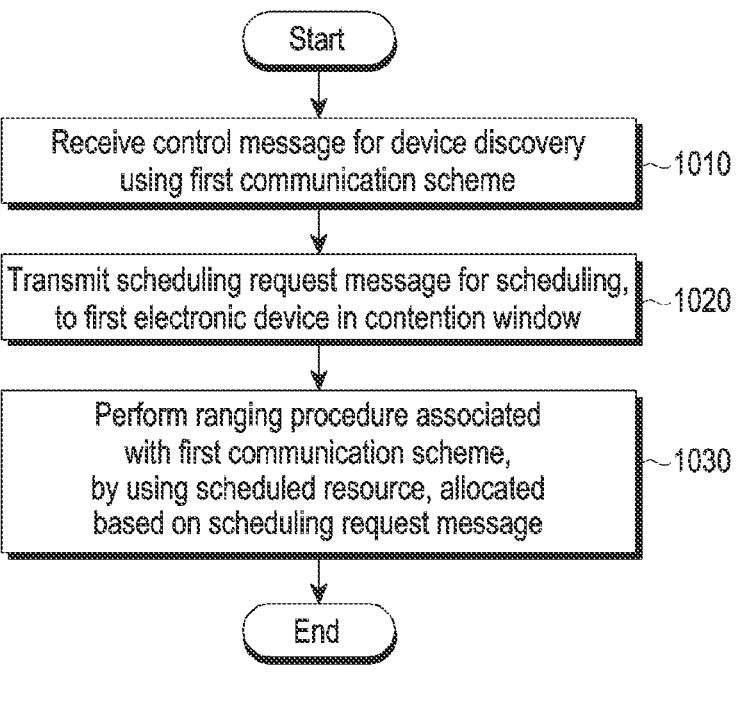
FIG. 10 is a flowchart illustrating a method of a second
electronic device according to an embodiment.

FIG. 10 is a flowchart illustrating a method of a second electronic device according to an embodiment.

In FIG. 10, a first electronic device corresponds to an electronic device performing the role of a UWB controller, and a second electronic device corresponds to an electronic device performing the role of a UWB controlee. A detailed description of each operation in FIG. 10 may refer to the above-described description in FIGS. 1 to 9.

The second electronic device may receive a control message for UWB ranging or device discovery using a first communication scheme, through the first communication scheme in step 1010. The control message may include information on a contention window.

The second electronic device may transmit a scheduling request message for scheduling of the second electronic device in the contention window to the first electronic device through the first communication scheme in step 1020. The scheduling request message may include identification information of the second electronic device.

The second electronic device may perform a ranging procedure associated with the first communication scheme by using a scheduled resource, allocated based on the scheduling request message in step 1030.

The second electronic device may receive, through a second communication scheme that is different from the first communication scheme, an advertising message including indication information indicating whether device discovery using the first communication scheme is used or device discovery using the second communication scheme is used.

When the indication information is configured with a first value indicating use of device discovery using the first communication scheme or a third value indicating use of both device discovery using the first communication scheme and device discovery using the second communication scheme, the second electronic device may activate the first communication scheme.

When there are a pre-configured number or more of repeating blocks in which no scheduling request message is received, in the contention window, the indication information may be changed from the first value indicating use of device discovery using the first communication scheme or the third value indicating use of both device discovery using the first communication scheme and device discovery using the second communication scheme to a second value indicating use of device discovery using the second communication scheme. When a pre-configured number or more collisions of a response message corresponding to the advertising message are detected, the indication information may be changed from the second value indicating use of device discovery using the second communication scheme to the first value indicating use of device discovery using the first communication scheme or the third value indicating use of both device discovery using the first communication scheme and device discovery using the second communication scheme.

The information on the contention window may include at least one of information on the size of the contention window, information on an ending slot of the contention window, information on a start slot and the ending slot of the contention window, or information on individual slot numbers of slots constituting the contention window.

The size of the contention window may be adjusted based on a ratio of used slots in the contention window.

The control message may include at least one of identification information of the control message, identification information of the first electronic device, or identification information of a service associated with the first communication scheme.

The control message may further include information on a session associated with the first communication scheme, and the information on the session may include at least one of information on a ranging method associated with the first communication scheme, information on a ranging frame configuration associated with the first communication scheme, information on an AoA report associated with the first communication scheme, or information on an STS configuration associated with the first communication scheme.

The scheduling request message may further include identification information of the scheduling request message.

The scheduling request message may further include at least one of the identification information of the first electronic device and the identification information of the service associated with the first communication scheme.

The control message may include a first slot in a first transport block, the scheduling request message may include a random slot in the contention window in the first transport block, the random slot being subsequent to the first slot, and the scheduled resource may correspond to at least one slot of a second transport block subsequent to the first transport block.

Figures 11, 12:
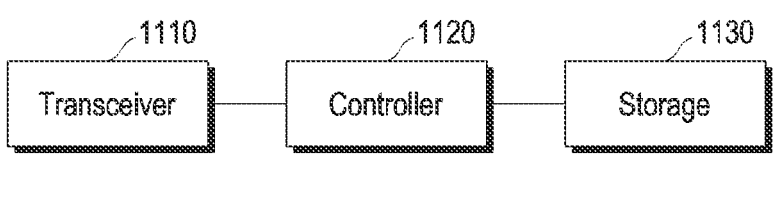
FIG. 11 illustrates a structure of a first electronic device
according to an embodiment.
FIG. 12 illustrates a structure of a second electronic
device according to an embodiment.

The first communication scheme may correspond to a communication scheme using UWB, and the second communication scheme may correspond to a communication scheme using BLE. FIG. 11 illustrates a structure of a first electronic device according to an embodiment.

In FIG. 11, a first electronic device may correspond to an electronic device (a first UWB device) performing the role of a UWB controller, and a second electronic device may correspond to an electronic device (a second UWB device) performing the role of a UWB controlee.

Referring to FIG. 11, the first electronic device may include a transceiver 1110, a controller 1120, and a storage 1130. The controller may be defined as a circuit, an application-specific circuit, or at least one processor.

The transceiver 1110 may transmit or receive a signal to or from another electronic device. The transceiver 1110 may transmit or receive data by using, for example, UWB communication.

The controller 1120 may control an overall operation of a UWB in-band discovery method. For example, the controller 1120 may control a signal flow between blocks to perform an operation according to the flowcharts described above. Specifically, the controller 1120 may control, for example, an operation of the UWB in-band discovery method described with reference to FIGS. 2 to 10.

The first electronic device (the first UWB device) may transmit a control message for contention-based access (or, contention-based ranging) by using a UWB communication scheme, the control message including information on a contention window (a contention access period (CAP)).

The first electronic device (the first UWB device) may receive a scheduling request message for scheduling-based access (or, scheduling-based ranging), in one slot in the contention window from the second electronic device (the second UWB device) by using the UWB communication scheme. The scheduling request message may be included in a ranging response message (RRM).

The first electronic device (the first UWB device) may configure a scheduled slot for the second UWB device, based on the scheduling request message. The scheduling request message may be used for UWB-based device discovery (in-band device discovery).

The scheduling request message may include media access control (MAC) address information of the second UWB device.

A slot in which the control message is transmitted and slots in the contention window may be included together in a pre-configured first ranging period (a first ranging round), and the scheduled slot for the second UWB device, configured based on the scheduling request message, may be included in a second ranging period (a second ranging round) subsequent to the first ranging period.

The contention window may start from a slot immediately following the slot in which the control message is transmitted, and information on the contention window may include contention window size information indicating the number of slots used in the contention window.

The first ranging period may further include at least one scheduled slot for scheduling-based access, and information on the contention window may include information on a start slot of the contention window and information on an ending slot of the contention window.

The slot in which the control message is transmitted may correspond to the first slot in the first ranging period.

The control message may further include at least one of device management list information including a list of address (e.g., MAC address) for at least one UWB device (e.g., responder), information related to a size of the device management list information, or information related to a UWB session.

A contention window size of the second ranging period may be determined based on a ratio of slots used in the contention window in the first ranging period.

The first electronic device (the first UWB device) may transmit, by using a BLE communication scheme, a BLE advertising packet including an indicator for indicating whether the UWB-based device discovery (in-band device discovery) is used or BLE-based device discovery (out-of-band device discovery) is used.

The storage 1130 may store at least one of information transmitted or received through the transceiver 1110 and information generated through the controller 1120. For example, the storage 1130 may store, for example, information and data for UWB in-band discovery described with reference to FIGS. 2 to 10.

FIG. 12 illustrates a structure of a second electronic device according to an embodiment. In FIG. 12, a first electronic device may correspond to an electronic device (a first UWB device) performing the role of a UWB controller, and a second electronic device may correspond to an electronic device (a second UWB device) performing the role of a UWB controlee.

Referring to FIG. 12, the second electronic device may include a transceiver 1210, a controller 1220, and a storage 1230. The controller in the disclosure may be defined as a circuit, an application-specific circuit, or at least one processor.

The transceiver 1210 may transmit or receive a signal to or from another electronic device. The transceiver 1210 may transmit or receive data by using, for example, UWB communication. The controller 1220 may control an overall operation of a UWB in-band discovery method. For example, the controller 1220 may control a signal flow between blocks to perform an operation according to the flowcharts described above. Specifically, the controller 1220 may control, for example, an operation of the UWB in-band discovery method described with reference to FIGS. 2 to 10.

The second electronic device (the second UWB device) may receive a control message for contention-based access (or, contention-based ranging) from the first electronic device (the first UWB device) by using a UWB communication scheme, the control message including information on a contention window (a contention access period (CAP)).

The second electronic device (the second UWB device) may transmit a scheduling request message for scheduling-based access (or, scheduling-based ranging), in one slot in the contention window to the first electronic device (the first UWB device) by using the UWB communication scheme.

The scheduling request message may be included in an RRM.

The scheduling request message may be used for UWB-based device discovery (in-band device discovery).

The scheduling request message may include MAC address information of the second UWB device.

A slot in which the control message is transmitted and slots in the contention window may be included together in a pre-configured first ranging period (a first ranging round), and the scheduled slot for the second UWB device, configured based on the scheduling request message, may be included in a second ranging period (a second ranging round) subsequent to the first ranging period.

The contention window may start from a slot immediately following the slot in which the control message is transmitted, and information on the contention window may include contention window size information indicating the number of slots used in the contention window.

The first ranging period may further include at least one scheduled slot for scheduling-based access, and information on the contention window may include information on a start slot of the contention window and information on an ending slot of the contention window.

The slot in which the control message is transmitted may correspond to the first slot in the first ranging period.

The control message may further include at least one of device management list information including a list of address (e.g., MAC address) for at least one UWB device (e.g., responder), information related to a size of the device management list information, or information related to a UWB session.

A contention window size of the second ranging period may be determined based on a ratio of slots used in the contention window in the first ranging period.

The second electronic device (the second UWB device) may receive, by using a BLE communication scheme, a BLE advertising packet including an indicator for indicating whether the UWB-based device discovery (in-band device discovery) is used or BLE-based device discovery (out-of-band device discovery) is used.

The storage 1230 may store at least one of information transmitted or received through the transceiver 1210 and information generated through the controller 1220. For example, the storage 1230 may store, for example, information and data for UWB in-band discovery described with reference to FIGS. 2 to 10.

Each of the first electronic device and the second electronic device in FIGS. 11 and 12 may have a protocol stack including an application layer, a MAC layer, a PHY layer, and a security layer.

The MAC layer and the PHY layer correspond to a MAC layer and a PHY layer based on UWB for UWB communication, and may follow, for example, the IEEE 802.15.4/4z standard and the content regulated in the FiRa Consortium Technical Requirements. In addition, the MAC layer and the PHY layer may correspond to a MAC layer and a PHY layer for supporting a communication scheme other than the UWB communication. For example, the MAC layer and the PHY layer may correspond to 5G commutation and/or Bluetooth™-based MAC layer and PHY layer for supporting 5G commutation and/or Bluetooth™ communication.

The service layer may define characteristics of a service including a payment service, a location-based service, etc. in the disclosure. In addition, the application layer and the security layer may designate a mechanism for UWB device and service discovery, a mechanism for implementing devices in a complementary scheme, and complementary security requirements. The service layer, the application layer, and the security layer may follow the content regulated in FiRa Consortium Technical Requirements.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, an element expressed in the plural may also include a single element, and an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method of a first ultra-wideband (UWB) device, the method comprising:

transmitting, by using a Bluetooth low energy (BLE) communication scheme, a BLE advertising packet comprising an in-band discovery indicator indicating whether a UWB-based device discovery is used or a BLE-based device discovery is used, wherein when the in-band discovery indicator indicates the UWB-based device discovery is used, the BLE advertising packet comprises UWB channel information, a UWB preamble code index, and a UWB physical layer parameter set;

transmitting a control message comprising first information on a contention window for contention-based access by using a UWB communication scheme, second information on a ranging device management list for a contention free window, and third information related to a size of the ranging device management list, the second information including an address for at least one UWB device; and receiving, from a second UWB device, a ranging response message, in a slot in the contention window by using the UWB communication scheme, wherein the ranging response message includes an address of the second UWB device and request of allocation of a ranging slot in the contention free window, wherein the address of the second UWB device is not included in the ranging device management list, wherein the first information indicates a number of ranging slots used in the contention window, and wherein a slot in which the control message is transmitted and slots in the contention window are included together in a ranging period.

2. The method of claim 1, wherein the contention window starts from a slot immediately following the slot in which the control message is transmitted.

3. The method of claim 1, wherein the ranging period includes at least one scheduled slot for scheduling-based access, and wherein the first information on the contention window includes information on a start slot of the contention window and information on an ending slot of the contention window.

4. The method of claim 1, wherein the slot in which the control message is transmitted corresponds to a first slot in the ranging period.

5. The method of claim 1, wherein the control message further comprises information related to a UWB session.

6. The method of claim 1, wherein a contention window size is determined based on a ratio of slots used in the contention window of the ranging period.

7. The method of claim 1, wherein the contention free window is included in the contention window.

8. The method of claim 1, further comprising receiving, from the second UWB device, a message including information on request for scheduling, in the contention window.

9. A method of a second ultra-wideband (UWB) device, the method comprising:

receiving, by using a Bluetooth low energy (BLE) communication scheme, a BLE advertising packet comprising an in-band discovery indicator indicating whether a UWB-based device discovery is used or a BLE-based device discovery is used, wherein when the in-band discovery indicator indicates the UWB-based device discovery is used, the BLE advertising packet comprises UWB channel information, a UWB preamble code index, and a UWB physical layer parameter set;

receiving, from a first UWB device, a control message comprising first information on a contention window for contention-based access by using a UWB communication scheme, second information on a ranging device management list for a contention free window, and third information related to a size of the ranging device management list, the second information including an address for at least one UWB device; and transmitting, to the first UWB device, a ranging response message, in a slot in the contention window by using the UWB communication scheme, wherein the ranging response message includes an address of the second UWB device and request of allocation of a ranging slot in the contention free window, wherein the address of the second UWB device is not included in the ranging device management list, wherein the first information indicates a number of ranging slots used in the contention window, and wherein a slot in which the control message is transmitted and slots in the contention window are included together in a ranging period.

10. The method of claim 9, wherein the contention window starts from a slot immediately following the slot in which the control message is transmitted.

11. The method of claim 9, wherein the ranging period includes at least one scheduled slot for scheduling-based access, and wherein the first information on the contention window includes information on a start slot of the contention window and information on an ending slot of the contention window.

12. The method of claim 9, wherein the slot in which the control message is transmitted corresponds to a first slot in the ranging period.

13. The method of claim 9, wherein the control message further comprises information related to a UWB session.

14. The method of claim 9, wherein a contention window size is determined based on a ratio of slots used in the contention window of the ranging period.

15. The method of claim 9,
wherein the contention free window is included in the contention window.

16. The method of claim 9, further comprising transmitting, to the first UWB device, a message including information on request for scheduling, in the contention window.

17. A first ultra-wideband (UWB) device comprising:
a transceiver; and
a controller configured to:
transmit, by using a Bluetooth low energy (BLE) communication scheme, a BLE advertising packet comprising an in-band discovery indicator indicating whether a UWB-based device discovery is used or a BLE-based device discovery is used, wherein when the in-band discovery indicator indicates the UWB-based device discovery is used, the BLE advertising packet comprises UWB channel information, a UWB preamble code index, and a UWB physical layer parameter set;
transmit a control message comprising first information on a contention window for contention-based access by using a UWB communication scheme, second information on a ranging device management list for a contention free window, and third information related to a size of the ranging device management list, the second information including an address for at least one UWB device; and receive, from a second UWB device, a ranging response message, in a slot in the contention window by using the UWB communication scheme, wherein the ranging response message includes an address of the second UWB device and request of allocation of a ranging slot in the contention free window, wherein the address of the second UWB device is not included in the ranging device management list, wherein the first information indicates a number of ranging slots used in the contention window, and wherein a slot in which the control message is transmitted and slots in the contention window are included together in a ranging period.

18. The first UWB device of claim 17,
wherein the contention free window is included in the contention window.

19. The first UWB device of claim 17, wherein the controller is configured to receive, from the second UWB device, a message including information on request for scheduling, in the contention window.

20. A second ultra-wideband (UWB) device comprising:
a transceiver; and
a controller configured to:
receive, by using a Bluetooth low energy (BLE) communication scheme, a BLE advertising packet comprising an in-band discovery indicator indicating whether a UWB-based device discovery is used or a BLE-based device discovery is used, wherein when the in-band discovery indicator indicates the UWB-based device discovery is used, the BLE advertising packet comprises UWB channel information, a UWB preamble code index, and a UWB physical layer parameter set;
receive, from a first UWB device, a control message comprising first information on a contention window for contention-based access by using a UWB communication scheme, second information on ranging device management list for a contention free window, and third information related to a size of the ranging device management list, the second information comprising address for at least one UWB device; and
transmit, to the first UWB device, a ranging response message, in a slot in the contention window by using the UWB communication scheme, wherein the ranging response message includes an address of the second UWB device and request of allocation of a ranging slot in the contention free window, wherein the address of the second UWB device is not included in the ranging device management list, wherein the first information indicates a number of ranging slots used in the contention window, and wherein a slot in which the control message is transmitted and slots in the contention window are included together in a ranging period.

21. The second UWB device of claim 20,
wherein the contention free window is included in the contention window.

22. The second UWB device of claim 20, wherein the controller is configured to transmit, to the first UWB device, a message including information on request for scheduling, in the contention window.

* * * * *